US006709330B1

(12) United States Patent
Klein et al.

(10) Patent No.: US 6,709,330 B1
(45) Date of Patent: Mar. 23, 2004

(54) STOCK SIMULATION ENGINE FOR AN OPTIONS TRADING GAME

(75) Inventors: Cynthia Ann Klein, New York, NY (US); Lawrence Scott Berlin, Glencoe, IL (US); Timothy J. Kostolansky, Oakland, CA (US); Jaime Rockwell Del Palacio, San Rafael, CA (US)

(73) Assignee: Ameritrade Holding Corporation, Annapolis Junction, MD (US)

( * ) Notice: Subject to any disclaimer, the term of this patent is extended or adjusted under 35 U.S.C. 154(b) by 233 days.

(21) Appl. No.: 09/640,788

(22) Filed: Aug. 18, 2000

Related U.S. Application Data

(60) Provisional application No. 60/149,708, filed on Aug. 20, 1999.

(51) Int. Cl.[7] ............................................. A63F 13/00
(52) U.S. Cl. ........................... 463/9; 273/278; 273/256; 434/107
(58) Field of Search .............................. 463/1, 42, 9, 22; 273/278, 274; 434/107, 219; 700/90, 91; 705/35, 1, 36, 37; 703/6

(56) References Cited

U.S. PATENT DOCUMENTS

| | | | | | |
|---|---|---|---|---|---|
| 5,713,793 | A | * | 2/1998 | Holte ............................. | 463/1 |
| 5,788,234 | A | * | 8/1998 | Siofer ......................... | 273/256 |
| 5,890,963 | A | * | 4/1999 | Yen ............................... | 463/42 |
| 6,064,985 | A | * | 5/2000 | Anderson ..................... | 705/36 |
| 6,151,585 | A | * | 11/2000 | Altschuler et al. .............. | 705/1 |
| 6,173,270 | B1 | * | 1/2001 | Cristofich et al. ............. | 705/37 |
| 6,226,623 | B1 | * | 5/2001 | Schein et al. .................. | 705/35 |
| 6,249,770 | B1 | * | 6/2001 | Erwin et al. ................... | 705/10 |
| 6,278,981 | B1 | * | 8/2001 | Dembo et al. ................. | 705/36 |
| 6,321,212 | B1 | * | 11/2001 | Lange ............................. | 705/1 |
| 6,390,472 | B1 | * | 5/2002 | Vinarsky ..................... | 273/256 |
| 6,405,204 | B1 | * | 6/2002 | Baker et al. ................... | 705/36 |
| 6,408,263 | B1 | * | 6/2002 | Summers ..................... | 434/107 |

OTHER PUBLICATIONS

Lawrence J. Gitman, Michael D. Joehnk, Fundamentals of Investigation, Sixth Ed, 1996, pp. XXVI, XXVII, 25, 68, 121, 172, 226, 266, 315, 359, 397, 433, 485, 528, 568, 615, 650, 691, 729, B–1.*
Chicago Board Options Exchange (CBOE), "The Basics", Aug. 11, 1999, 4 pages.

* cited by examiner

*Primary Examiner*—John M Hotaling, II
(74) *Attorney, Agent, or Firm*—Sterne, Kessler, Goldstein & Fox P.L.L.C.

(57) ABSTRACT

An options simulation engine for an options trading game. The present invention comprises a game engine for keeping track of game time and game settings, an options market simulator for providing a real-world options trading environment, and a portfolio manager engine for keeping track of a player's portfolio. The options market simulator comprises a basic stock price generator for moving stock prices, a news/rumor generator for moving stock prices, and an options pricing generator for pricing options. The portfolio manager comprises an available cash/minimum balance mechanism for determining how much a player is charged for buying and/or selling options and stocks, and for maintaining a player's positions, a risk analysis mechanism for determining the amount of money a player can lose for any given stock or option, a margin requirements mechanism for keeping track of the minimum equity required in a player's account to support the player's total investment position, a profit and loss mechanism for determining a player's profit and loss throughout the game and on a weekly basis, and a trading rules/limitations mechanism that prevents a player from breaking a trading rule or exceeding a limitation during game play.

34 Claims, 20 Drawing Sheets

STOCK SIMULATION ENGINE FOR AN OPTIONS TRADING GAME

This application claims the benefit of priority under 35 U.S.C. §119(e) to application Ser. No. 60/149,708, filed Aug. 20, 1999, which is incorporated in its entirety herein by reference.

BACKGROUND OF THE INVENTION

1. Field of the Invention

The present invention relates generally to the field of information processing. More particularly, the present invention relates to a game engine for simulating a real world options trading environment.

2. Related Art

For many years a sub-culture of the investment community has gathered daily on the floor of the Chicago Board Options Exchange to engage in a high-risk contest of the most nerve-wracking order. Success is measured in portfolio size, and tomorrow's news can ruin even the most savvied investor.

An option is a contract that gives the buyer the right to purchase or sell the underlying security at a specific price for a specific time period. The contract obligates the seller to meet the delivery terms if the buyer exercises the contract right. A call is an option contract that gives the buyer (holder) the right to buy 100 shares of the underlying stock at the strike price any time on or before the expiration day. A call gives the seller (writer) the obligation to sell 100 shares of the underlying stock at the strike price if the option is exercised. A put is an option contract that gives the owner (buyer) the right to sell 100 shares of stock at the strike price any time on or before the expiration day. A put gives the seller (writer) the obligation to buy 100 shares of stock at the strike price if the option is assigned. Strike price is the price at which an option holder can purchase (for a call) or sell (for a put) the underlying security.

Options trading on the floor of an exchange is about speculation. If an investor anticipates a certain directional movement in the price of a stock, the right to buy or sell that stock by purchasing an option contract can offer an attractive investment opportunity. The decision as to the type of option to buy depends on whether an investor's outlook with regards to the particular stock is positive (i.e., bullish) or negative (i.e., bearish). If an investor anticipates an upward movement in the stock, a call option offers an opportunity to share in the upside potential of the stock. Alternatively, if an investor anticipates a downward movement in the stock, a put option protects against the downside risk without limiting profit potential. Options give investors the opportunity to leverage a relatively small investment into a large profit by purchasing an option contract at a fraction of a stock's market value. Options can also be used in a less speculative, less risky manner. In either case, options, used intelligently, are just another investment tool, and as such, must be understood to be used effectively.

One reason more investors do not trade options is simply lack of knowledge. Options trading is sophisticated, and the strategies are complex. Presently available options trading products are designed for professional traders. These products are based on heavy mathematics and require a user to have strong mathematical skills.

What is needed is an options game that explains options trading in a language that regular investors can understand. What is also needed is an options game that enables a player to interactively apply what they have learned about options in a fun and interesting way. What is further needed is an options game that simulates real world options trading in the marketplace.

SUMMARY OF THE INVENTION

The present invention satisfies the above mentioned needs by providing an options game engine that simulates real-world options trading in the marketplace. In the present invention, option prices are driven by the effect of news stories on the stock price of the companies in a player's portfolio, as well as by semi-random movements of the price of each stock.

Briefly stated, the present invention is an options simulation engine for an options trading game. The present invention comprises a game engine for keeping track of game time and game settings, an options market simulator for providing a real-world options trading environment, and a portfolio manager engine for keeping track of a player's portfolio.

The options market simulator comprises a basic stock price generator for moving stock prices, a news/rumor generator for moving stock prices, and an options pricing generator for pricing options.

The portfolio manager comprises an available cash/minimum balance mechanism for determining how much a player is charged for buying and/or selling options and stocks, and for maintaining a players positions, a risk analysis mechanism for determining the amount of money a player can lose for any given stock or option, a margin requirements mechanism for keeping track of the minimum equity required in a player's account to support the player's total investment position, a profit and loss mechanism for determining a player's profit and loss throughout the game and on a weekly basis, and a trading rules/limitations mechanism that prevents a player from breaking a trading rule or exceeding a limitation during game play.

An advantage of the options game of the present invention is that it appeals to the novice as well as the professional trader. The options game of the present invention includes an options tutorial section and an options history section to bring the novice up to speed in the trading of options.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
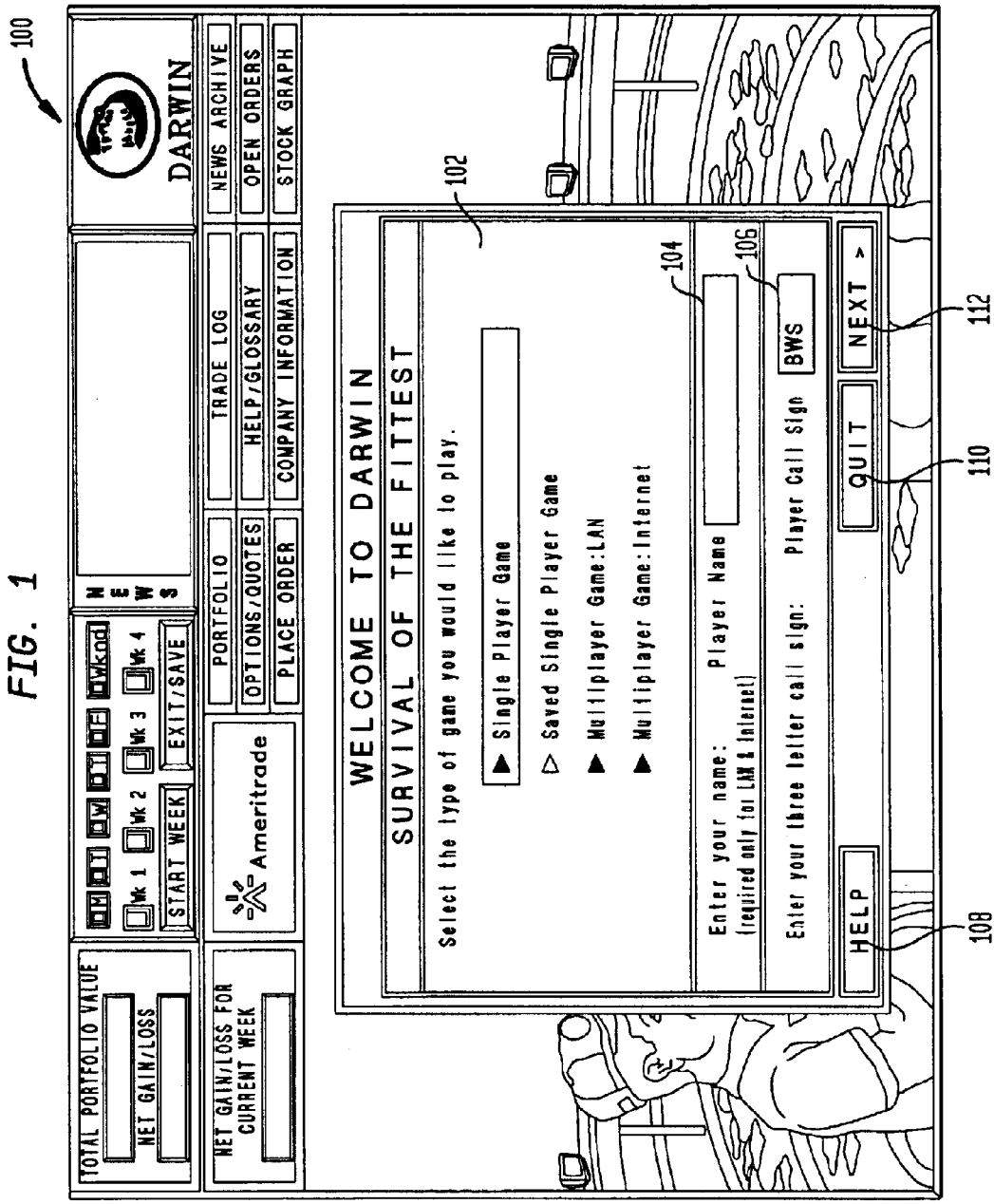
FIG. 1 is a diagram illustrating a getting started screen for the options game of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

Table of Contents 1.0 Overview of the Game
2.0 Information Screens
3.0 Options Simulation
   3.1 Game Engine
   3.2 Option Market Simulation
      3.2.1 Basic Stock Price Movement
      3.2.2 News/Rumor Generator
         3.2.2.1 How news Affects Trades
      3.2.3 Floor Broker
      3.2.4 Options Pricing Generator
         3.2.4.1 Call Price
         3.2.4.2 Put Price
         3.2.4.3 Delta
         3.2.4.4 Bid-Ask Spread
            3.2.4.4.1 Bid-Ask Randomizer
         3.2.4.5 Strike Price Generator
         3.2.4.6 Infinite Liquidity
      3.2.5 Simulation Objects
         3.2.5.1 Company Object
            3.2.5.1.1 Volatility
         3.2.3.2 Internal Financial Calculator Object
   3.3 Portfolio Manger Engine
      3.3.1 Available Cash/Minimum Balance Mechanism
      3.3.2 Risk Analysis
      3.3.3 Margin Requirements
      3.3.4 Profit and Loss Mechanism
      3.3.5 Trading Rules/Limitations
4.0 Environment
5.0 Conclusion While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1.0 Overview of the Game

The present invention is an options trading tutorial and game simulation. Options trading is a very complex and risky venture. The present invention provides an understanding of options theory and enables a player to practice the mechanics of trading options to become a more informed investor.

The options game of the present invention begins with a basic tutorial in the theory, mechanics and history of options trading. Once a user has completed the tutorial, the user is ready to play the game.

A player initially chooses to play a single player game, or a multi-player game. Multi-player games must be played over a local area network (LAN) or the Internet. Next, a player chooses three companies out of a total of 15. These three companies constitute a player's trading pit. A trading pit is a specific area of the trading floor of an exchange used to trade a specific option or security.

The options game of the present invention is divided into 4 trading weeks, separated by weekends to simulate a time-condensed version of a 30-day options cycle. The game cannot be paused during the week. However, weekends provide a player the opportunity to relax and catch up on the news, stock quotes, etc. before resuming play of the game.

To begin the game, a player clicks a start week button found on a main pit screen. Immediately, news regarding the companies in a player's pit is displayed over a news ticker, and six virtual traders begin showing up to interact with the player in the pit. The six virtual traders are animated characters that provide rumors related to the companies in the player's pit. It is the player's responsibility to analyze the available information on each of the companies, the news coming over the news ticker, and the rumors that the player hears in the pit, and then formulate an appropriate trading strategy. Players trade in and out of options and equity positions as they see fit until the end of the fourth week, at which time the game ends.

In a multi-player game, the object of the game is to amass the largest total portfolio value by the end of the game. In a single player game, the object of the game is to amass a large portfolio by the end of the game.

The options game of the present invention is designed to simulate an actual options trading floor. A player can buy, sell, and sell short stocks and options on a variety of different companies. A player can then observe how their portfolio positions behave in a variety of different market conditions. The present invention utilizes the Black-Scholes options pricing model combined with an innovative simulation engine to make the options game perform like an actual market.

The options game of the present invention includes a trading pit where the action takes place; a Quotron™ where the available options on the companies in the player's pit are listed; a company information screen where a player can learn background and historical information about the companies in the player's pit; a trading screen for the player to place option and equity orders; a stock graph where the player can track the price of the underlying stock; a news ticker and news archive screen where the player can view relevant news on the companies in the player's pit; a portfolio screen where the player can review the status of the player's portfolio; and a help/glossary screen where a player can get answers to game questions and review a glossary of options terms.

2.0 Information Screens

FIG. 1 is a diagram illustrating a getting started screen for the options game of the present invention. Getting started screen 100 is comprised of a select field for types of games 102, two identifier fields 104 and 106, a help button 108, an exit game button (QUIT) 110, and a continue button (NEXT) 112.

The options game of the present invention can be played alone or with other players via a local area network (LAN) or the Internet. Game types include single player game, saved single player game, multi player game: LAN, and multi player game: Internet. A saved single player game allows a single player to resume play of a game that was previously exited before completion of the game. Select types of games field 102 allows a player to select from the four types of games to play.

Identifier 104 requires a player to enter their name for LAN and Internet games only. Identifier 106 requires a player to enter a three letter call sign. The call sign is used throughout the game to identify the player.

Help button 108 allows a player to obtain answers to start game sequence questions. Clicking on help button 108 causes a help screen to appear that defines each component of getting started screen 100.

Exit game button 110, when clicked, enables a player to exit the game. Continue button 112 enables a player to proceed to the next screen. Note that continue button 112 remains inactive until all the requested information of getting started screen 100 has been entered. Once all of the required information has been entered, continue button 112 is activated to allow a player to proceed to the next screen.

Figure 2:
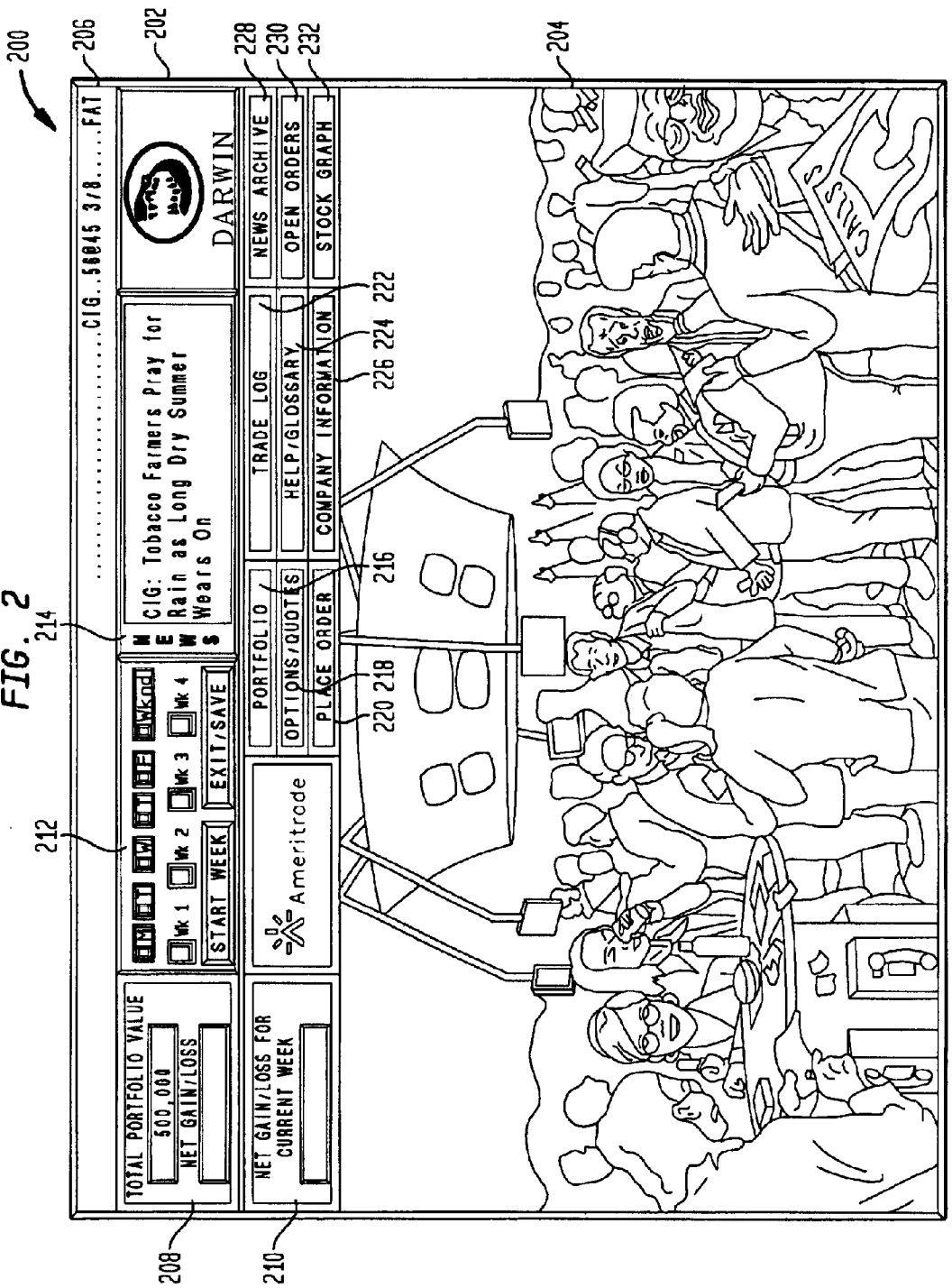
FIG. 2 is a diagram illustrating a main pit screen for the options game of the present invention.

FIG. 2 is a diagram illustrating a main pit screen for the option game of the present invention. After a player has completed entering all the required information needed to begin the game, the player will arrive at main pit screen 200. Main pit screen 200 is where the action happens! Main pit screen 200 is composed of the perennial menu bar on the top 202 and a pit on the bottom 204. Perennial menu bar 202 comprises a stock ticker display 206, a first game meter field 208, a second game meter field 210, a game time barometer 212, a news ticker 214, and a plurality of information screen button 216 through 232.

Stock ticker 206 displays trades and stock prices in real time for the companies in a player's pit.

First game meter field 208 will be described below with reference to FIG. 3.

Second game meter field 210 keeps track of a player's net gain/loss for the current week of game play.

Game time barometer 212 displays the amount of time that has transpired in a game. Game time barometer 212 is described below with reference to FIG. 4.

News ticker 214 displays headlines related to the companies in a player's pit. News headlines roll across news ticker 214.

The plurality of information screen buttons 216 through 232 include portfolio screen 216, options/quotes screen 218, place order screen 220, trade log screen 222, help/glossary screen 224, company information screen 226, news archive screen 228, open order screen 230, and stock graph screen 232. A player can access any one of the plurality of information screens by clicking on buttons 216 through 232 of perennial menu bar 202. Clicking on any one of the plurality of information screen buttons 216–232 will cause different screens to pop up in front of main pit screen 200. Clicking on portfolio button 216 enables a player to review the status of the player's portfolio. Clicking on options/quotes button 218 enables a player to view call and put options that are available to trade. Clicking on place order button 220 enables a player to place a trade. Clicking on tradelog button 222 enables a player to review all of the trades that the player has placed. Clicking on help/glossary button 224 enables a player to get answers to game questions and to review a glossary of options terms. Clicking on company information button 226 enables a player to view detailed information on each of the player's companies. Clicking on news archive button 228 enables a player to review the news headlines for the current week. Clicking on open orders button 230 enables a player to review, edit, or cancel open orders made by the player. Clicking on stock graph button 232 enables a player to view information on the performance of the companies in the player's pit in real time.

Figure 3:
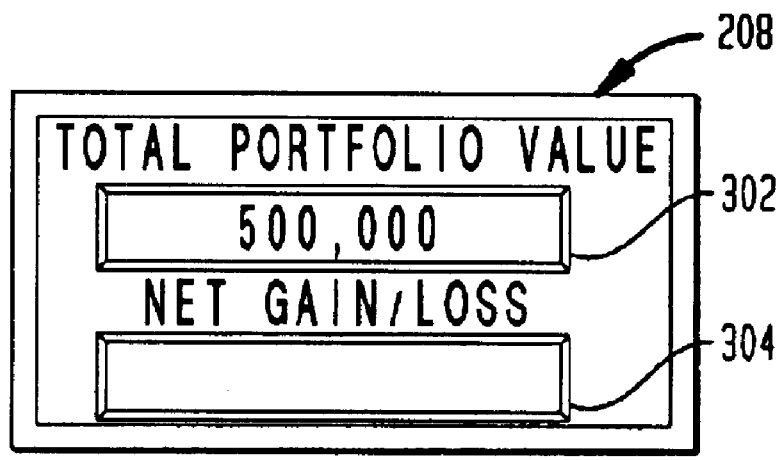
FIG. 3 is a diagram illustrating a game meter field according to an embodiment of the present invention.

FIG. 3 is a diagram illustrating first game meter field 208. Game meter field 208 comprises a total portfolio value meter 302 and a net gain/loss game meter 304. Total portfolio value meter 302 keeps track of a player's total portfolio value. Net game/loss meter 304 keeps track of a player's total net gain/loss throughout the game.

Figure 4:
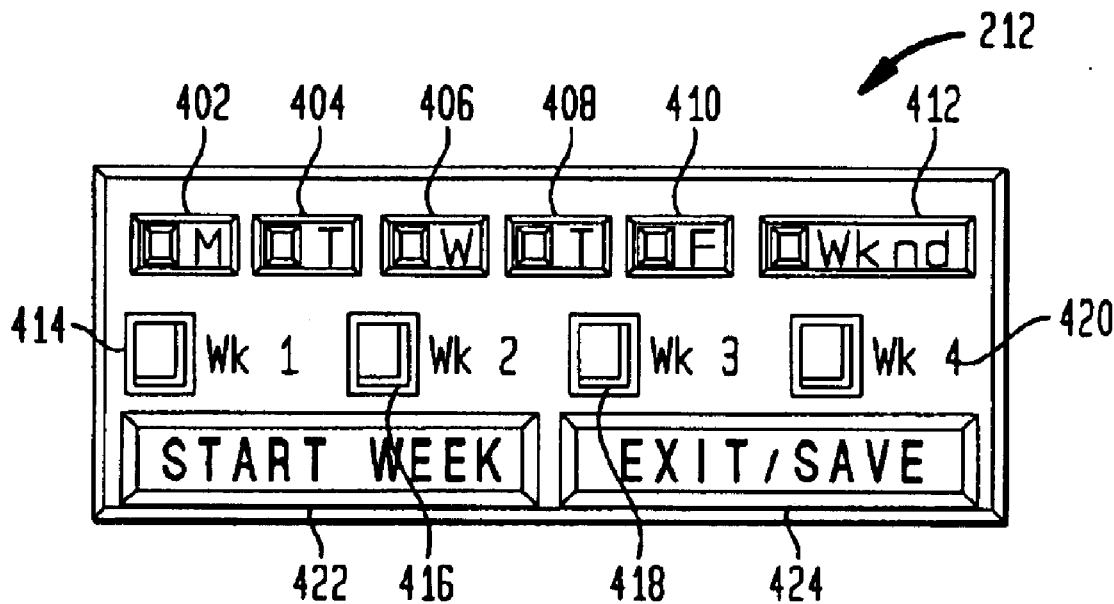
FIG. 4 is a diagram illustrating a game time barometer according to an embodiment of the present invention.

FIG. 4 is a diagram illustrating game time barometer 212. As previously stated, the options game of the present invention is made up of four trading weeks and four weekends. During the weekend, a player is allowed to review the company information 226, news 228, portfolio 216, and trade log 222 screens. Game time barometer 212 tracks a player's progress through the game. Game time barometer 212 comprises daily indicators 402–410, a weekend indicator 412, weekly indicators 414–420, a start week button 422, and an exit/save button 424.

Daily indicator buttons 402–410 represent the days of the week (i.e., Monday through Friday). Daily indicator buttons 402–410 illuminate to indicate the current day of game play. Weekend indicator 412 illuminates to indicate that the game is currently in a weekend state. Weekly indicators 414–420 illuminate to indicate the current week of game play.

In a single player game, the pace of the game is controlled by clicking on the start week button 422. Start week button 422 indicates that a player is ready to begin or to resume game play. In a multi-player game, the weekend will last two minutes after which game play will automatically resume. Thus, start week button 422 is only enabled for single player games.

Exit/save button 424 allows a single player to automatically save the game. If a single player chooses to resume game play at a later time, the player can pick up where the player left off. In a multi-player game, clicking on exit/saved button 424 enables a player to exit the game.

Figure 5:
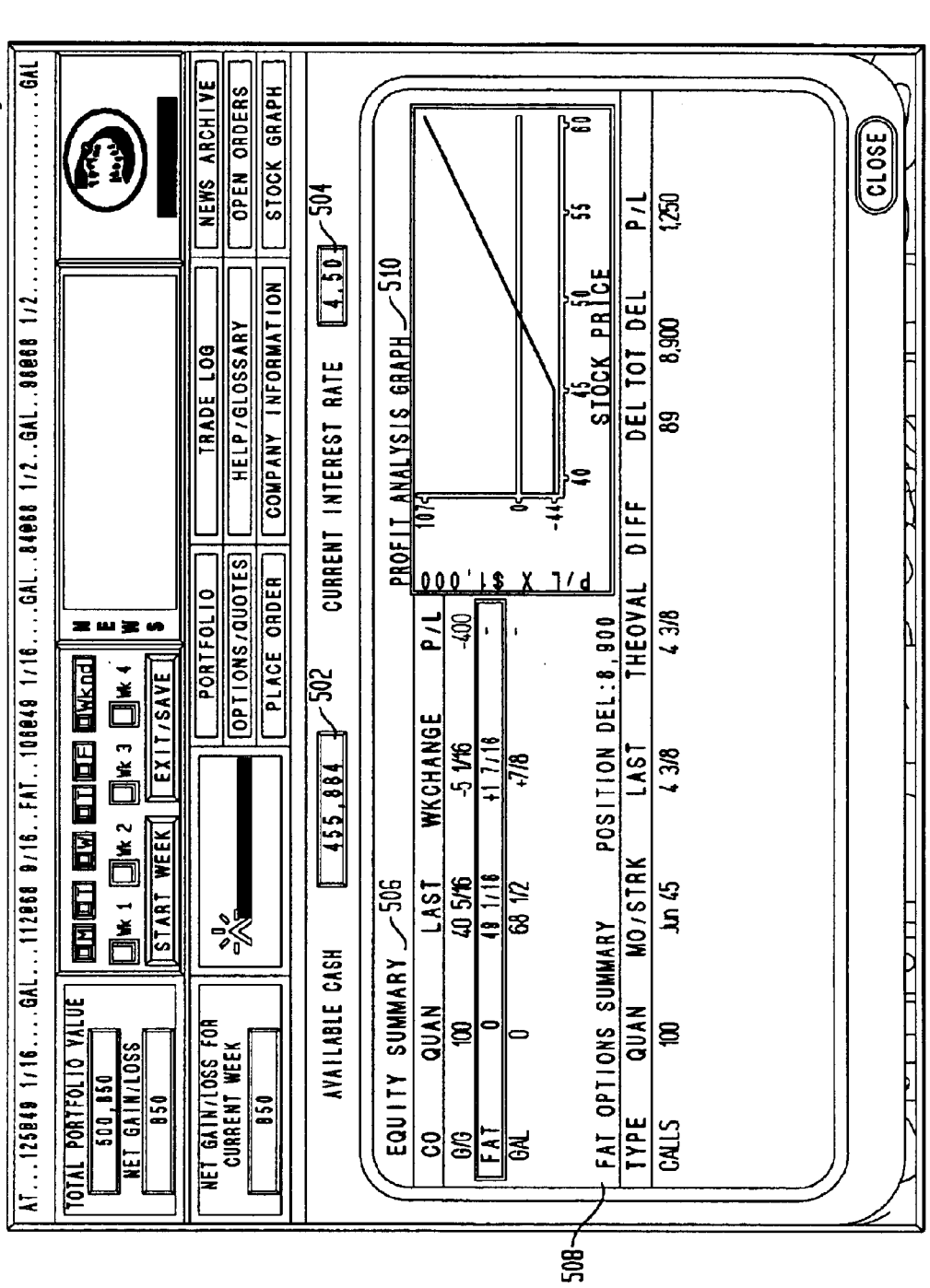
FIG. 5 is a diagram illustrating a portfolio information screen for the options game of the present invention.

FIG. 5 is a diagram of portfolio information screen 216 for the options game of the present invention. Portfolio information screen 216 comprises an available cash field 502, a current interest rate field 504, an equity summary 506, an option summary 508, and a profit analysis graph 510. Portfolio information screen 216 provides a financial summary of a player's equity and option positions for the companies in the player's pit. Portfolio information screen 216 is updated dynamically, so that a player can watch their portfolio move as the price of the underlying stock moves.

Available cash field 502 displays the amount of money a player has left in cash to invest in more stocks and options. The option game of the present invention is a risk-based system, so the available cash 502 is based on the risk inherent in a player's current holdings.

Equity summary 506 is a summary of a player's equity positions. Equity summary 506 displays: the company symbol (CO), the quantity of shares held in the company (QUAN), the last traded price for the stock (LAST), the change in price of the stock since last week (WK CHANGE), and the profit/loss for the stock. When a player clicks on a company in equity summary 506, options summary 508 will display the player's options positions in the company.

Options summary 508 is a summary of all the player's options positions for the selected company in equity summary 506. Option summary 508 displays the type of option (i.e. a call or put), the quantity, the expiration month and strike price, the last traded price, the theoretical value, the difference between the last price and the theoretical value, delta, the total delta, and the profit/loss. Theoretical value is the value of an option using a Black-Scholes formula. Delta is a measurement of the rate at which an option's price changes with a one point change in the price of the underlying stock. Both theoretical value and delta are discussed below in sections 3.2.4 and 3.2.4.3, respectively.

Profit analysis graph 510 is a visual representation of a player's total option/equity position in a company and a player's profit/loss potential as the company's stock price moves.

Portfolio information screen 216 also includes a close button 512. Close button 512 enables a player to return to main pit screen 200.

Figure 6:
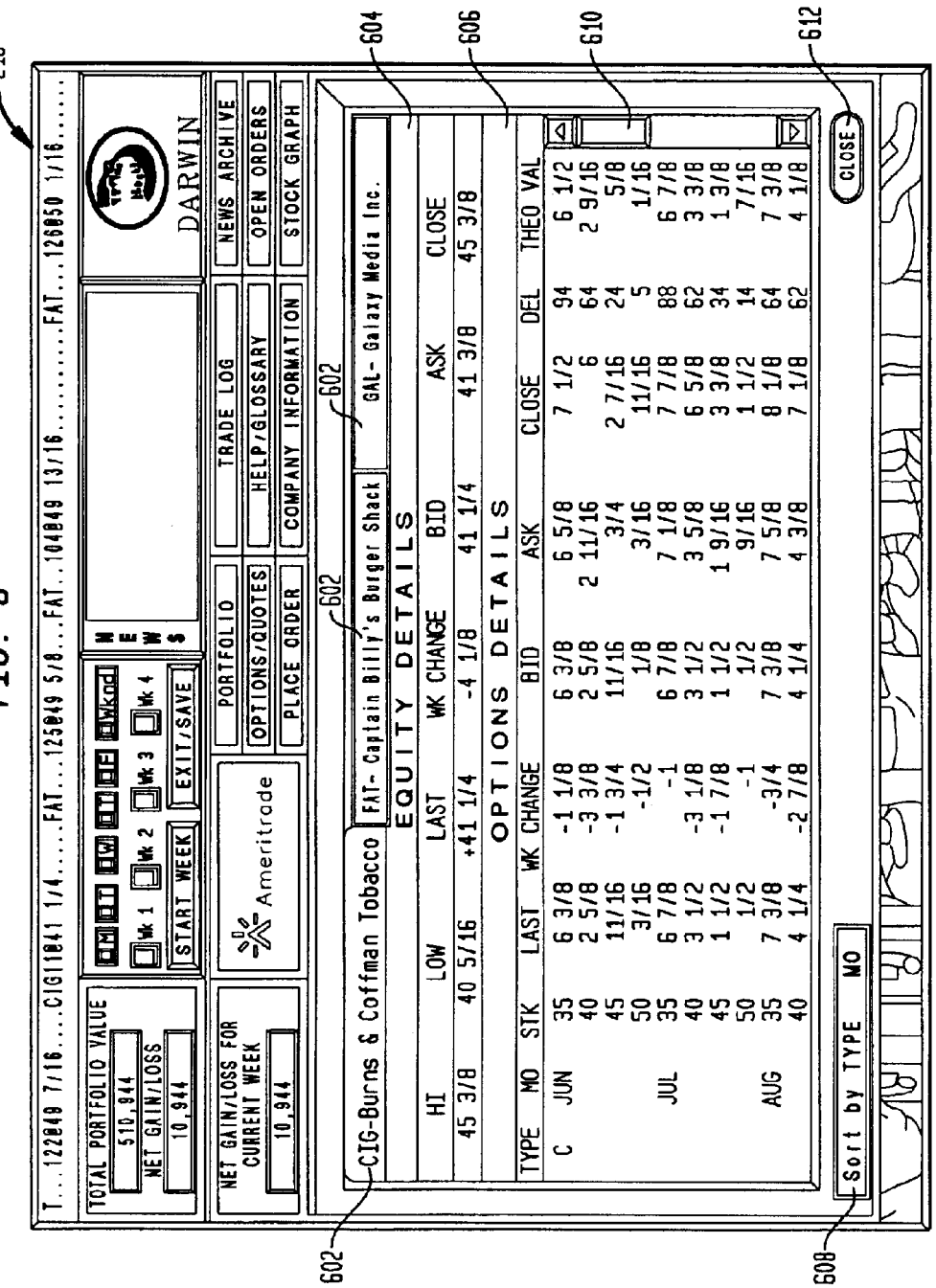
FIG. 6 is a diagram illustrating an options/quotes screen for the options game of the present invention.

FIG. 6 is a diagram illustrating options/quotes screen 218 for the options game of the present invention. Options/quotes screen 218 is similar to the Quotron™. The Quotron™ is the data source that real world options traders use to obtain quotes on options and equity prices. Players use the option/quotes information screen 218 to obtain quotes for the companies in their portfolio. Options/quotes information screen 218 updates in real time as the price of the underlined stock changes and new options are created. Options/quotes information screen 218 comprises navigation tabs 602, company equity details 604, company option details 606, type/month toggle button 608, scroll bar 610, and close button 612.

Navigation tabs 602 allow a player to select a company to view the specific option and equity information for that company. Equity details 604 include the game high (HI), the game low (LOW), the last trade (LAST), the difference between the last trade and the close price (WK CHANGE), the bid price (BID), the ask price (ASK), and last week's close price.

Game high represents the highest the last price has been since the game started. Game low represents the lowest the last price has been since the game started.

LAST represents the last trade. A plus or a negative sign in front of the number represents the direction of the last tick. If the last price was lower than the current one the tick is positive and a plus sign is shown. If the last price was higher, the tick is negative, and a minus sign is shown. If the last price was the same, the tick remains unchanged from the previous tick.

The bid is the current price at which the player can sell. The ask is the current price at which the player can buy. The close is the last week's close. Last weeks close is calculated as soon as the week ends and it is always equal to the last when the week finishes.

Options detail 606 lists the type of option (TYPE), the expiration month of the option (MO), the strike price (STK), the last trade (LAST), the weeks change (WK CHANGE), the bid price (BID), the ask price (ASK), the last week's close (CLOSE), the delta (DEL), and the theoretical value (THEO VAL).

The type of option is either a call or a put. TYPE is represented by "C" for call and "P" for put.

Type/month toggle button 608 allows a player to display option details either by type or by month. Scroll bar 610 enables a player to scroll through options details 606. Close button 612, when clicked, returns a player to main hit screen 200.

Figure 7:
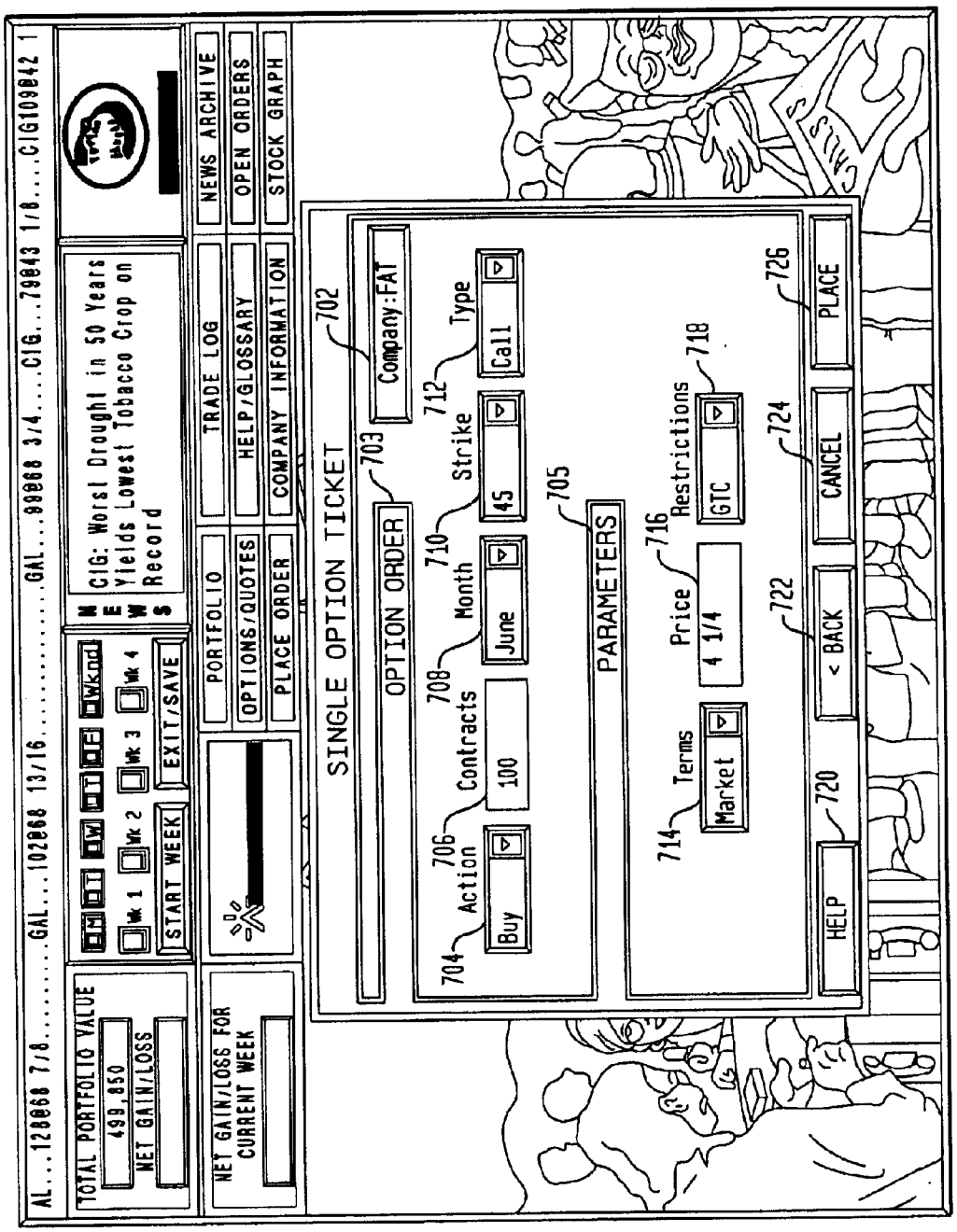
FIG. 7 is a diagram illustrating an exemplary place order information screen for the options game of the present invention.

FIG. 7 is a diagram illustrating an exemplary place order information screen 220 for the options game of the present invention. Place order information screen 220 provides step by step assistance to a player for successfully placing an order. On a single option ticket order screen, a player can choose market, limit, and stop orders. On a double option order screen (not shown), a player can choose to place their order at market or as a debit, credit, or even money order. All orders that are not placed at the market will remain on the open orders screen until they are filled. One can also place terms and restrictions on trades. Place order information screen 220 for a single option ticket comprises a company field 702, an option order field 703 and a parameter field 705. Option order field 703 includes an action field 704, a contracts field 706, a month field 708, a strike field 710, and a type field 712. Parameter field 705 includes a terms field 714, a price field 716, and a restrictions field 718. Place order sequence screen 220 also includes a help button 720, a back button 722, a cancel button 724, and a place button 726.

Company field 702 displays the company symbol. Action field 704 describes the action to be taken. For example, the action shown to be taken is to buy an option. Alternatively the action could be to sell an option. Contracts 706 refers to the number of option contracts a player would like to buy or sell. Months 708 is a list of available months based on security and options. The default is the next expiration month. Strike 710 is a list of available strike prices based on security, month, and options. Type 712 allows a player to select the order type: call or put.

Terms field 714 selects the terms of the order: Market, Limit, or Stop. A market order is a trading order to buy or sell a security at the current market price. For example, if the terms are at market the trade is executed when placed. A limit order is a trading order to buy or sell a security at a specified (limit) price. A stop order is a type of contingency trading order that becomes a market order if and when the security trades at the specific price. Buy stop orders are above the market price and sell stop orders are below the market price.

When a player selects a limit or stop order, a player must enter a price in price field 716. The range of acceptable prices is 1–300 plus a fraction (e.g., 230 ¼).

Restrictions field 718 represent the trading restrictions placed on a trade. Trading restrictions include good till canceled and good for one week. Good till canceled requires that a trade be active as open until it is filled or explicitly canceled by the user. Trades placed with a good for one week restriction will be active until they are filled or when the week the order was placed ends.

Help button 720 can be chosen at any time during game play to allow a player to obtain detailed information about place order information screen 220. Back button 722 enables a player to return to the previous screen. Cancel button 724 enables a player to cancel the order. Place button 726 enables a player to place the order.

Figure 8:
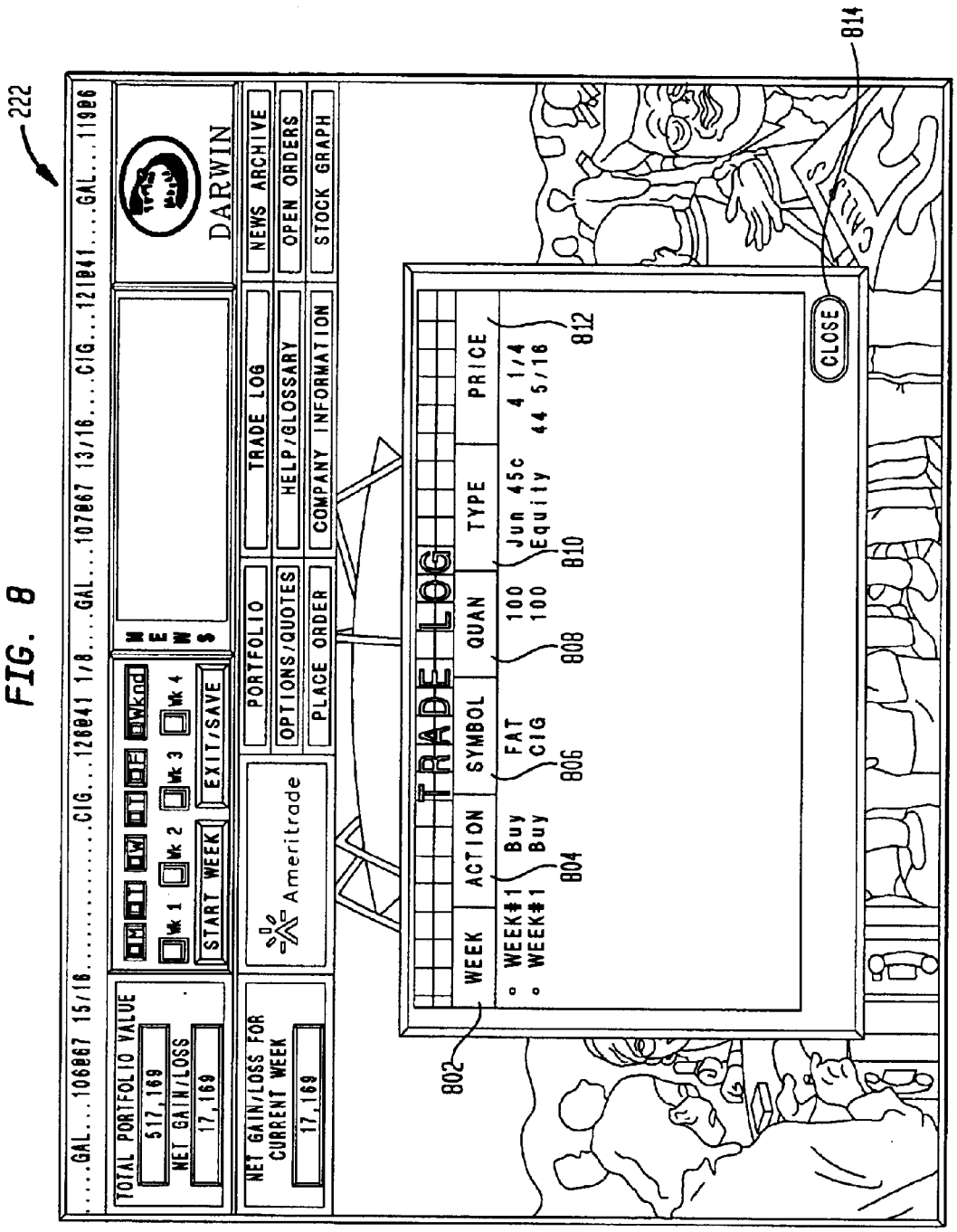
FIG. 8 is a diagram illustrating a trade log information screen for the options game of the present invention.

FIG. 8 is a diagram illustrating a trade log information screen 222 for the options game of the present invention. Trade log information screen 222 comprises a list of all of the orders a player has executed during game play. Trade log screen 222 will help a player track their trading activity and cost basis. Trade log indicator screen 222 shows all executed trades. If a trade is composed of two options or an equity and an option, only the first row of the trade will have a bullet. Trade log information screen 222 lists the following information: week 802, action 804, symbol 806, quantity 808, type 810, and price 812.

Week 802 refers to the week in which the order was placed. Action 804 refers to a buy, sell, or sell short. Symbol 806 refers to the symbol of the company on which the trade was placed. Quantity 808 refers to the number of shares/contracts in the trade. Type 810 will show equity for a stock trade. Alternatively, for an options trade the column will show the expiration month, strike price, and either a "C" or a "P" for call or put. Price 812 refers to the purchase price of the trade.

Trade log information screen 222 also includes a close button 814. Close button 814, when clicked, returns a player to main pit screen 200.

Figure 9:
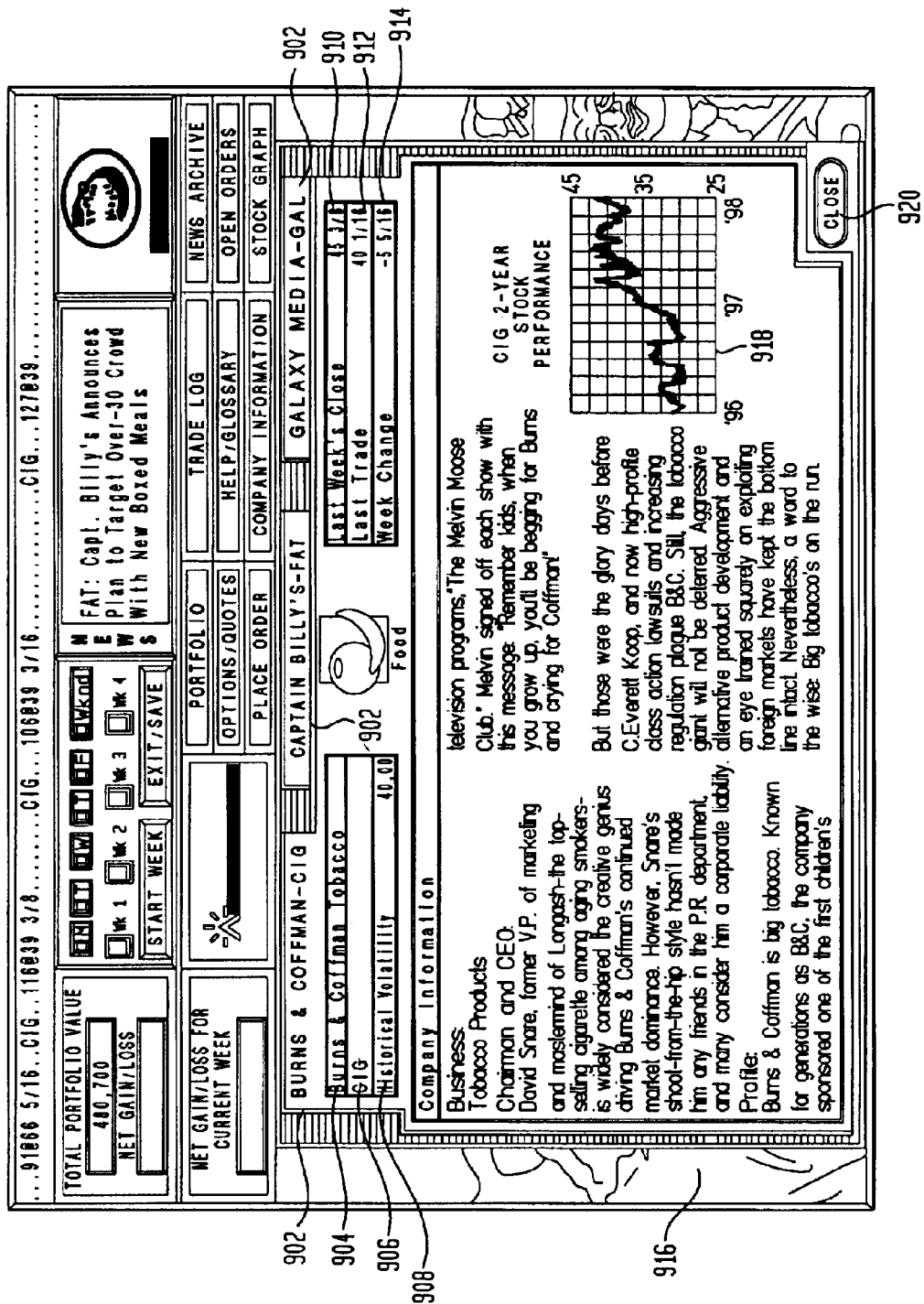
FIG. 9 is a diagram illustrating a company information screen for the options game of the present invention.

FIG. 9 is a diagram illustrating company information screen 226 for the options game of the present invention. Company information screen 226 provides background information on the three companies in a player's pit. Company information screen 226 also provides clues to the company's possible performance during game play. Company information screen 226 comprises navigation tabs 902, a company name field 904, a company symbol field 906, a historical volatility field 908, a last weeks close field 910, a last trade field 912, a week change field 914, a company profile field 916, a two year stock performance chart 918, and a close button 920.

Navigation tabs 902 are used to select the company in which company information is to be displayed. Field 904 displays the name of the company. Field 906 displays the three letter symbol of the company. Field 908 displays the historical volatility of the company. Field 910 displays last weeks close price. Field 912 displays the last trade price. The last trade price is the price at which the last trade was made. Week change field 914 indicates whether the price has gone up or down since the last week and the amount of change for the week.

Company information 916 provides a company profile for the selected company. Two year stock performance chart 918 is a graph representing a company's two year stock performance. Close button 912 is used to return the player to main pit screen 200.

Figure 10:
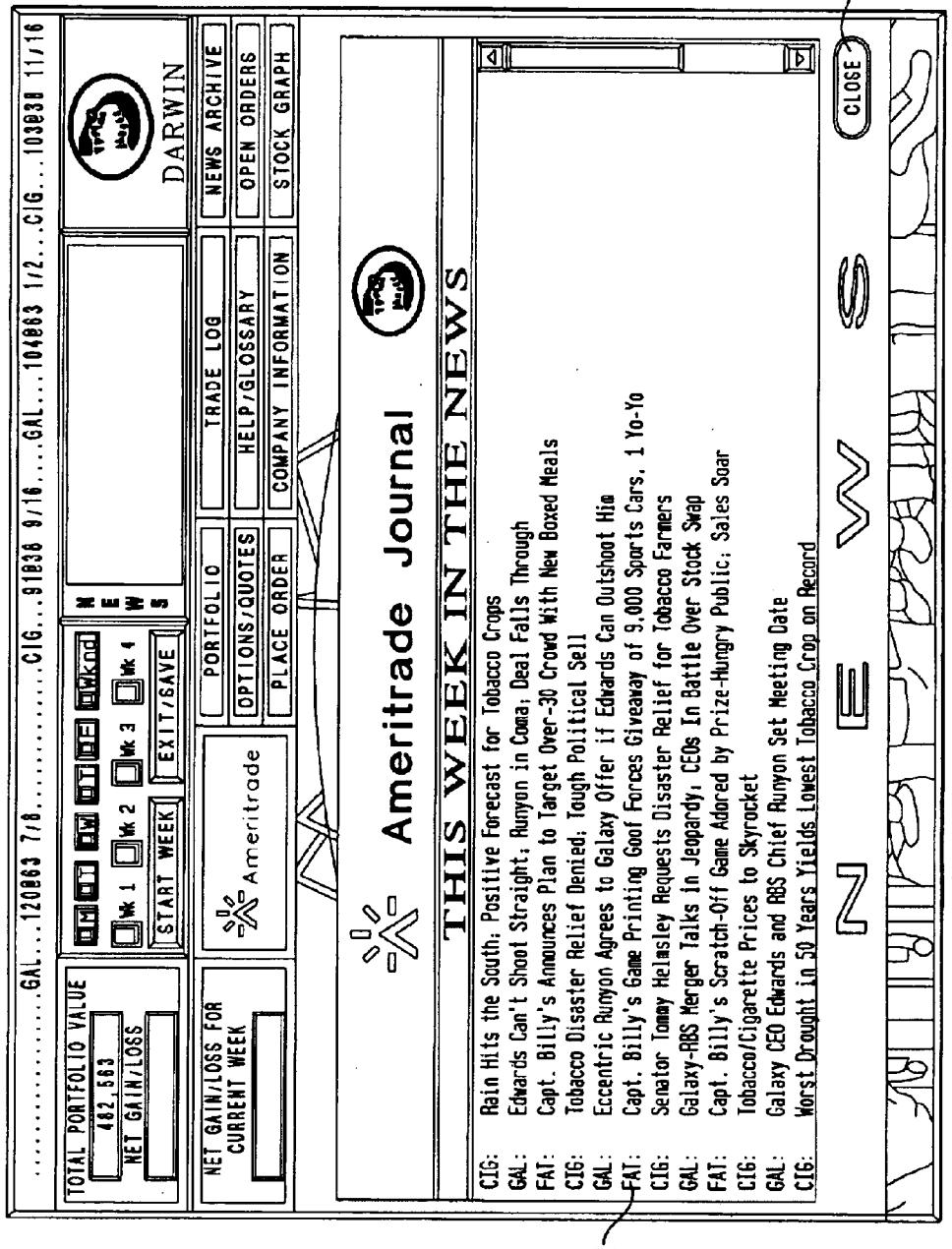
FIG. 10 is a diagram illustrating a news archive screen for the options game of the present invention.

FIG. 10 is a diagram illustrating news archive screen 228 for the options game of the present invention. News archive screen 228 allows a player to view a complete week's news. Each news headline is proceeded by the company's three letter call sign to help a player quickly track a company. News archive screen 228 only logs the news of a players current week of game play. When the player clicks on the start week button to begin a new week, the news archive is refreshed.

News archive screen 228 is comprised of a list of news articles 1002 and a close button 1004. List of news articles 1002 lists each news headline proceeded by the company's three letter call sign. Close button 1004 enables a player to return to main pit screen 200.

Figure 11:
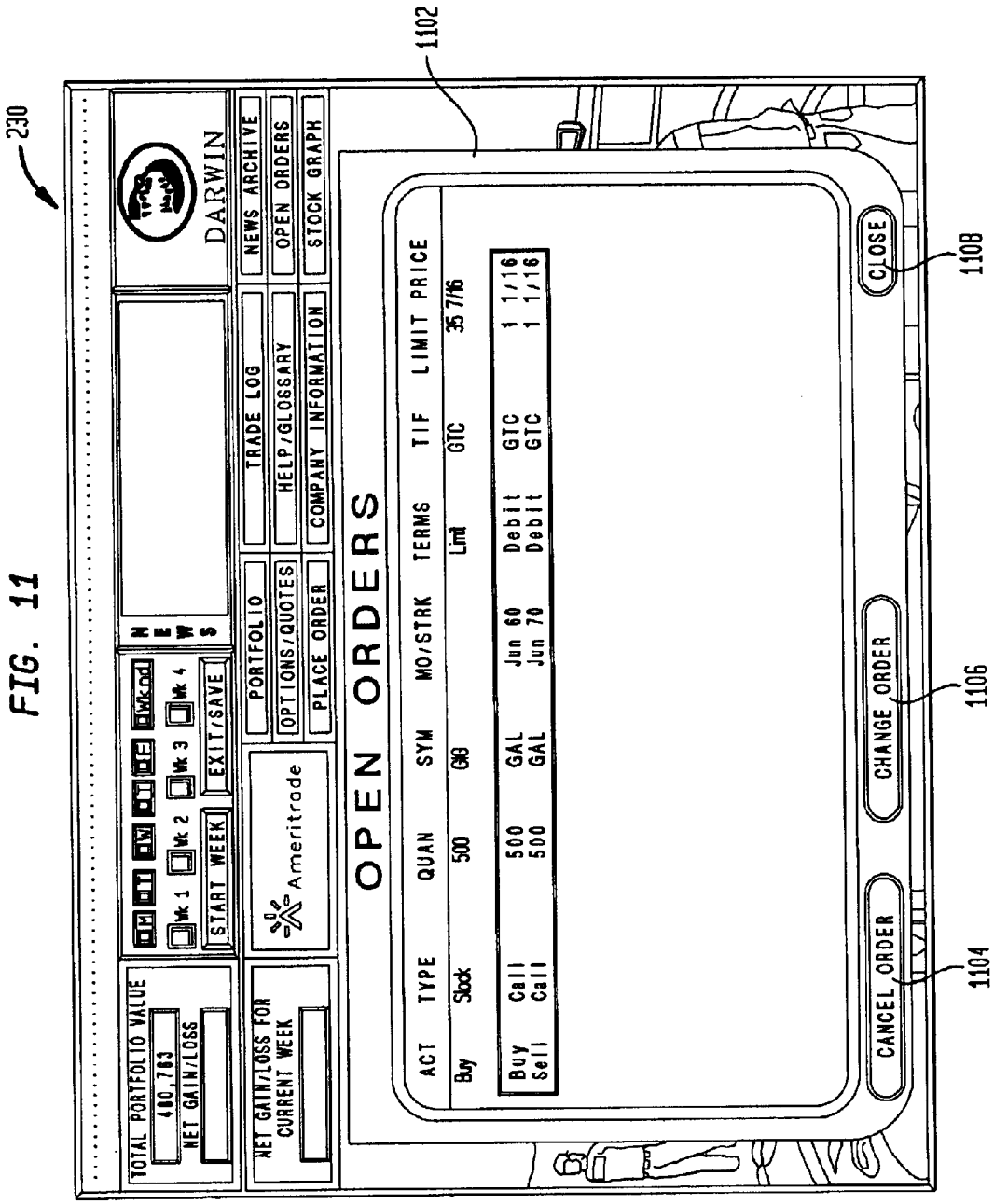
FIG. 11 is a diagram illustrating an open orders information screen for the options game of the present invention.

FIG. 11 is a diagram illustrating open orders information screen 230 for the options game of the present invention. Open order screen 230 shows the detailed status of unfilled limit orders and unfilled stop orders. Open order screen 230 comprises and open orders field 1102, a cancel order button 1104, a change order button 1106, and a close button 1108.

Open orders field 1102 contains a detailed status of unfilled limit orders and unfilled stock orders. For each order listed in open orders field 1102, the following information is provided: the action (ACT), the type (TYPE), the quantity (QUAN), the symbol (SYM), the expiration month and strike price (MO/STRK), the terms (TERMS), the restrictions (TIF) and the limit price (LIMIT PRICE).

Cancel order button 1104 allows a user to cancel an order. The player will receive a confirmation dialog box. To confirm that the player wants to cancel the selected order the player must click yes on the confirmation dialog box.

Change order button 1106 allows a player to change an order. Upon selecting change order button 1106, the player's original order ticket will pop up. The player can then edit any field that is not greyed out. When the player has finished making changes, the play can then click place order to place the order. The changes will be applied to the order the player selected on open orders screen 230.

Close button 1108 enables a player to return to main pit screen 200.

Open orders screen 230 updates dynamically, so if a player is viewing screen 230 and an order is filled, the player will get a notice informing the player that the order has been filled. The filled order will not longer be displayed on screen 230.

Figure 12:
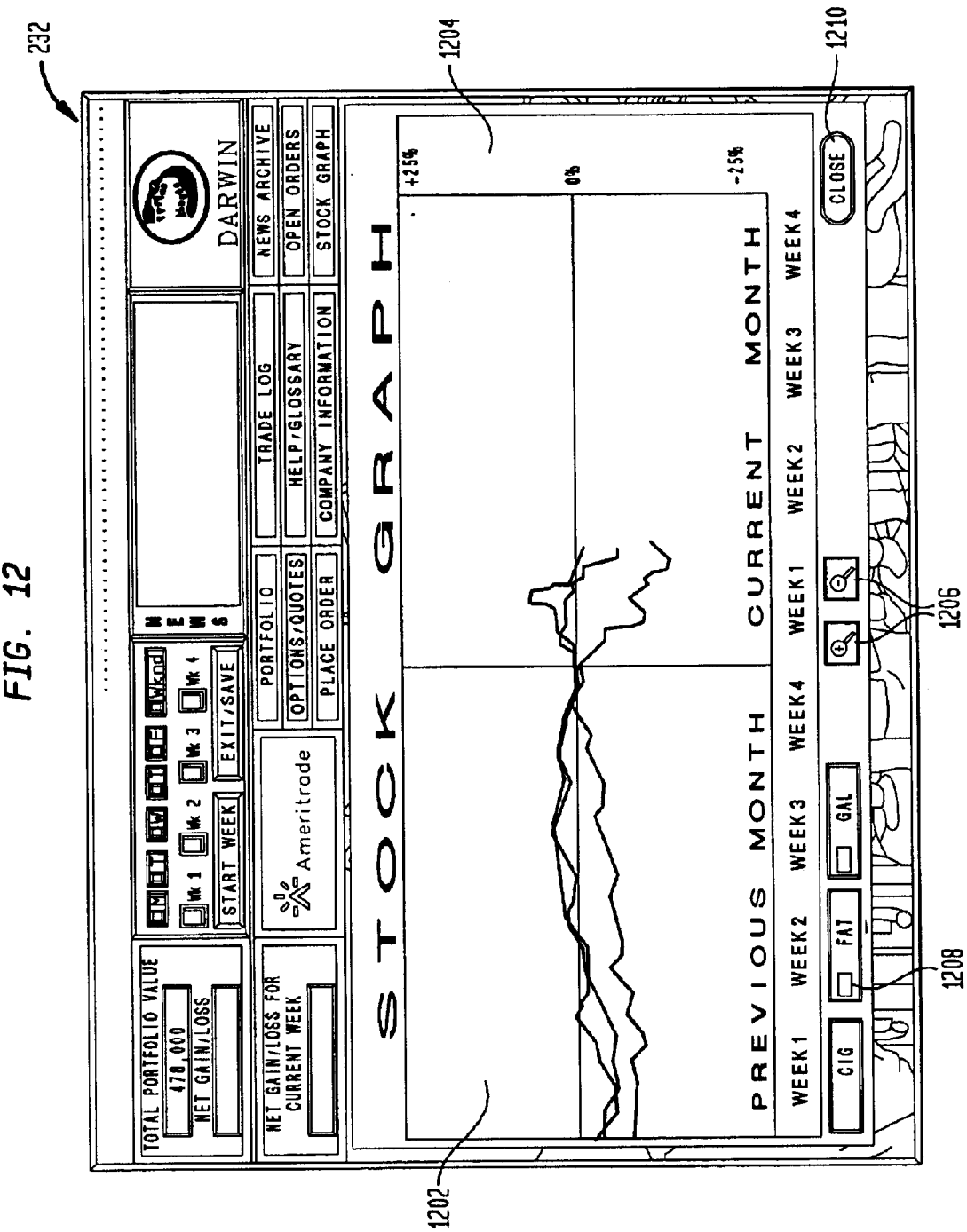
FIG. 12 is a diagram illustrating a stock graph information screen for the options game of the present invention.

FIG. 12 is a diagram illustrating stock graph information screen 232 for the options game of the present invention. Stock graph information screen 232 displays information on the performance of the companies in a players pit over the four weeks before the player begins playing, and in real-time for the four weeks of a players game play. Stock graph information screen 232 comprises a prior month field 1202, a current month field 1204, a zoom field 1206, a key field 1208, and a close button 1210.

Previous month field 1202 displays the performance of the company in a players pit over the four weeks prior to the beginning play. Current month field 1204 displays the performance of the companies in the players pit in real-time for the four weeks of the players game play.

Key field 1208 represents a key that identifies a particular company's performance. Each company symbol in key field 1208 is represented using a different color (not visible on FIG. 12). Zoom button 1206 enable a player to view the performance of the companies in the players pit in more or less detail. Close button 1210 enables a player to return to main pit screen 200.

3.0 Options Simulation Engine

Figure 13:
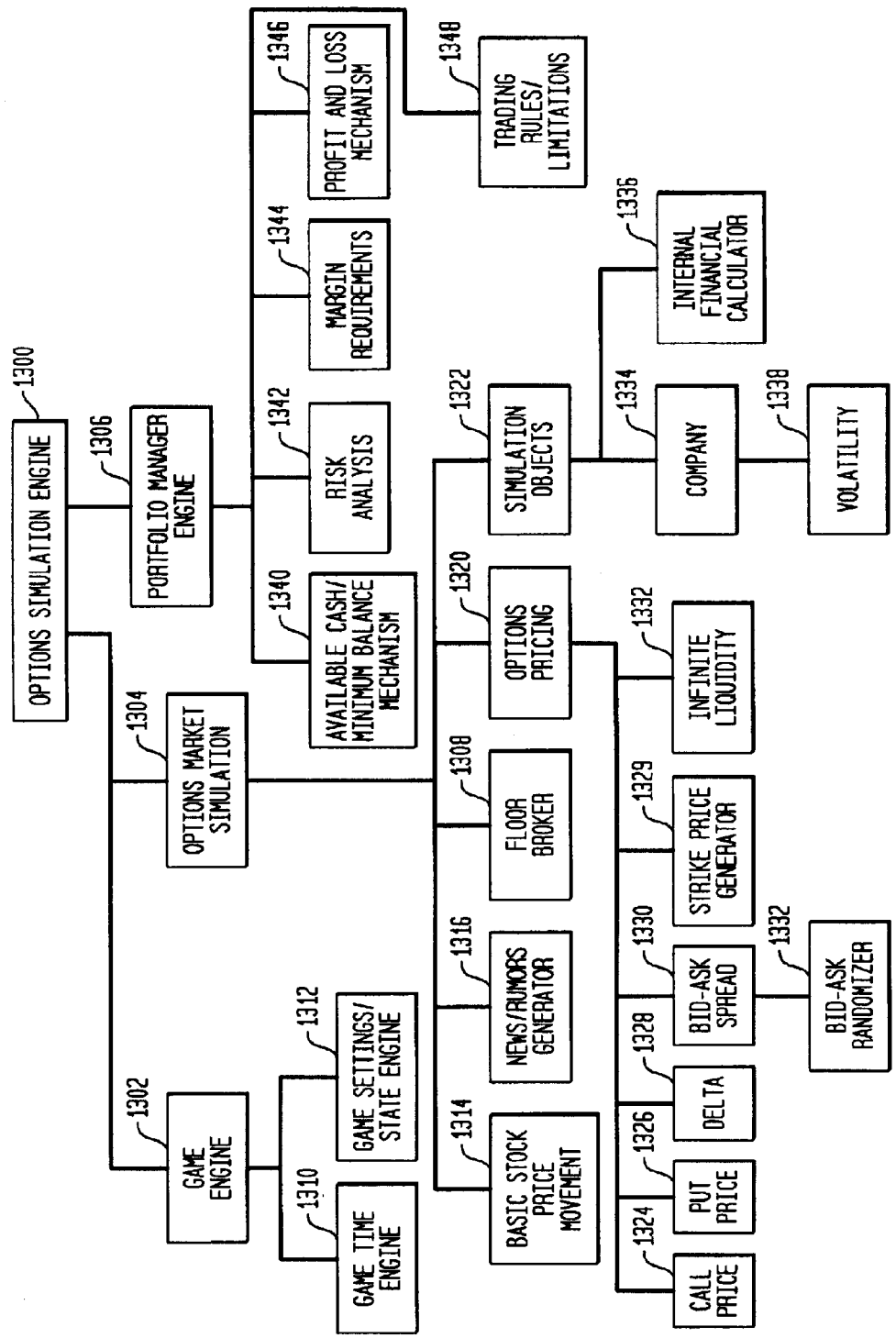
FIG. 13 is a block diagram illustrating an option simulation engine according to an embodiment of the present invention.

FIG. 13 is a block diagram illustrating an option simulation engine 1300. Option simulation engine 1300 is comprised of a game engine 1302, an option market simulation 1304, and a portfolio manager engine 1306.

3.1 Game Engine

Game engine 1302 is responsible for keeping track of the game time and the state of the game. Game engine 1302 is comprised of a game time engine 1310 and a game settings/state engine 1312.

Game time engine 1310 is responsible for keeping track of the elapsed time in the game and for notifying the change of time states to the time related elements in the game. The time frame for the options game of the present invention occurs over a period of four simulation weeks. Each week lasts ten minutes with weekends at the end. In a single player game, the player controls the length of the weekend. In LAN and Internet game play, the weekend is controlled and lasts for a period of two minutes.

Players will not be able to pause the simulation during the week. During the weekend, the game is saved automatically and the user can either exit the game at any time, review the status of the game (that is, the week's news, players' positions, etc.), or purchase stocks and options. Note that there is no trading over the weekend. Players will be able to fill out order tickets over the weekend, but, as in the real world, these trades will be executed when the market opens on Monday.

Game time engine 1310 keeps track of the following time variables: game time, days of the week, and game days. Game time is the time elapsed since the game started in seconds. Day of the week is the day of the week that is currently being played. Game days is the elapsed time since the beginning of the game in days.

When the option game of the present invention begins, the game time is zero, day of the week is weekend, and game days is zero. One week of play for the option game of the invention is ten minutes, and thus, one day is equal to two minutes. The weekends count as two days for the game days variable.

Game settings/state engine 1312 contains the information related to setting up the game as well as the information about the current state of the game. Game settings/state engine 1312 also enables players to resume play of a game previously exited. Game settings include the game type, such as single player game, LAN-based game or Internet game; game length (based on game type); the companies selected in a player's pit; an all cash portfolio or a portfolio containing pre-set positions; and the length of the weekend in seconds. Game state holds the information about the current state of the game, such as time, days, type of game, list of companies, single players versus multi player.

3.2 Option Market Simulation

Option market simulation 1304 is comprised of a basic stock price movement 1308, a news/rumor generator 1316, a floor broker 1318, an option pricing generator 1320, and simulation objects 1322. Option market simulation 1304 provides a simulated real-world options trading environment.

3.2.1 Basic Stock Price Movement

Stock and option prices are driven by semi-random movements of the price of each stock and the effect of news stories about a company. Basic stock price movement 1314 generates these semi-random movements by employing a normal distribution that combines the initial volatility (i.e., standard deviation) that a company starts with and the volatility computed from the last N trades. A random change is therefore defined as:

$$\text{random change} = \text{normal}(0.0, \text{volatility}/10) \quad (1)$$

where: N=10.

Although N is set equal to 10 in the above equation, N is not limited to a value of 10. One skilled in the relevant art(s) would know that other values for N, such as 20, 30, or 40, could be used without departing from the scope and spirit of the present invention.

A basic stock price movement generated by basic stock price movement 1314 is defined as:

$$\text{Basic stock price movement} = \text{old stock price} + \text{random change} \quad (2)$$

3.2.2 News/Rumor Generator

As previously stated, stock market simulation 1304 is based on semi-random movements of the price of each stock and the effect of news stories. News is the pivotal ingredient in the option game of the present invention. The prices of all stocks and options are linked to news events. The present invention provides news stories about a company as a combination of linear strings and random events. Each news story will have a weighted positive or negative effect (ranging from −5 to +5) on the company of which the news story is associated. Additionally, this weighted affect is randomized so that if the same story is repeated it will have a different affect.

A news string is a series of one or more stories that happen in a sequential fashion. Each company in a player's pit has associated with it several news strings. When news/rumor generator 1316 generates a new news story for a company, it takes the next story in the string. News/rumor generator 1316 continues in this fashion until the news string is played out completely.

Figure 14:
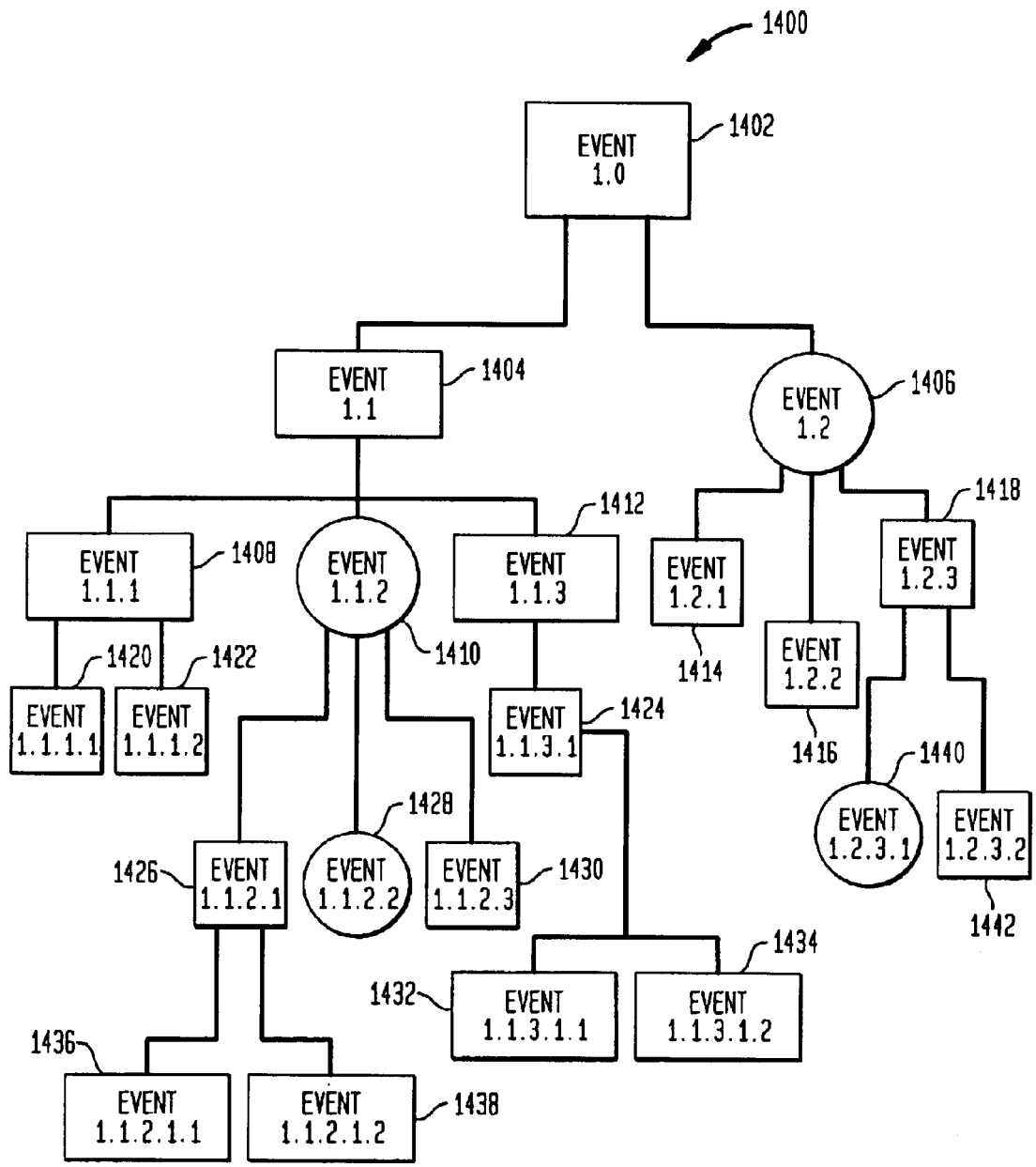
FIG. 14 illustrates an exemplary news tree according to an embodiment of the present invention.

FIG. 14 illustrates an exemplary news tree 1400. News tree 1400 is comprised of twelve linear news strings. News within news tree 1400 may include news stories (shown in blocks) and/or rumors (shown in circles). A first linear news string is comprised of news events 1402, 1404, 1408 and 1420. A second linear news string is comprised of news events 1402, 1404, 1408 and 1422. A third linear news string is comprised of news event 1402, 1404, 1426 and 1436, and rumor 1410. A fourth linear news string is comprised of news events 1402, 1404, 1426 and 1438, and rumor 1410. A fifth linear news string is comprised of news events 1402 and 1404, and rumors 1410 and 1428. A sixth linear news string is comprised of news events 1402, 1404, and 1430, and rumor 1410. A seventh linear news string is comprised of news events 1402, 1404, 14012, 1424, and 1432. An eighth linear news string is comprised of news events 1402, 1404, 1412, 1424, and 1434. A ninth linear news string is comprised of news events 1402 and 1414, and rumor 1406. A tenth linear news string is comprised of news events 1402 and 1416, and rumor 1406. An eleventh linear news string is comprised of news events 1402 and 1418, and rumors 1406 and 1440. A twelfth linear news string is comprised of news events 1402, 1418 and 1442, and rumor 1406.

Event 1402 represents the top level news story for a particular company. Event 1404 and rumor 1406 represent a second level news story for the same company. Events 1408, 1412, 1414, 1416 and 1418, and rumor 1406 represent third level events for the same company. Events 1420, 1422, 1426, 1424 and 1442, and rumors 1428 and 1440 represent fourth level events for the same company. Events 1436, 1438, 1432 and 1434 represent fifth level events for the company.

A player selects three companies at the beginning of the game to create their pit. The present invention is not limited to a player selecting three companies. One skilled in the relevant art(s) would know that more or less companies could be chosen by a player without departing from the scope of the present invention. Once the game starts, the news engine may play a news event or a rumor for one of the three companies at random. This is accomplished using the hat method. The company names selected by a player are placed in a hat. The first company pulled from the hat receives its news/rumors first. The second company pulled from the hat receives its news/rumors second. And the third company pulled from the hat receives its news/stories last.

Figure 15:
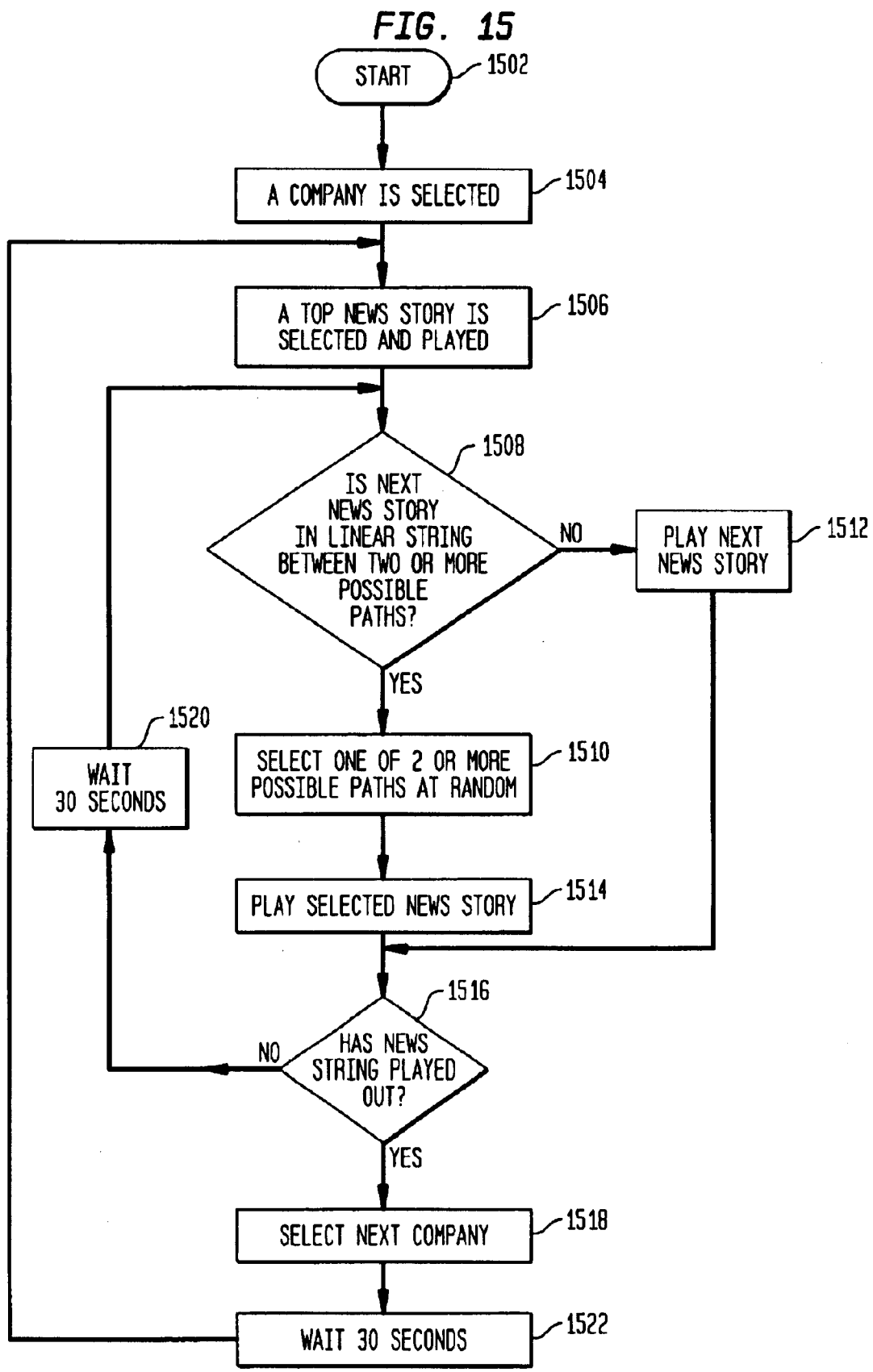
FIG. 15 is flow diagram illustrating how a news/rumor generator generates all news events according to an embodiment of the present invention.

FIG. 15 is flow diagram illustrating how news/rumor generator 1316 generates all news events/rumors. The process begins with step 1502 where control is immediately passed to step 1504. In step 1504, a company is selected by pulling a company name from a hat. Control then passes to step 1506.

In step 1506 a top news story is selected for the company selected in step 1504. Control then passes to decision step 1508.

In decision step 1508 it is determined whether the next news story in the linear news string is one of two or more possible news events/rumors. If the linear news tree does provide one of two or more possible news events/rumors, control then passes to step 1510.

In step 1510 one of the two or more possible news events/rumors is selected at random. The random selection consists of selecting news event/rumor one or two by pulling one of the numbers (i.e., one or two) out of a hat. If more than two possible news events/rumors are shown at a particular level then a number representing each possible news event/rumor is placed in the hat, and only one number maybe pulled from the hat to indicate the chosen news event/rumor. Control then passes to step 1514.

In step 1514, the selected news story is played. Control then passes to decision step 1516.

Returning to step 1508, if the next news story in the linear news string is only a single news event/rumor, control then passes to step 1512. In step 1512 the next news event/rumor is played. Control then passes to decision step 1516.

In decision step 1516, it is determined whether the linear news string has played out. If the linear news string has played out, control then passes to step 1518.

In step 1518 a new company is selected. Control then passes to step 1522 where a 30 second wait is applied. After the 30 second wait, control then passes to step 1506 where the process begin again for playing a new news string for a new company.

Returning to decision step 1516, if the linear news string has not played out, control then passes to step 1520. In step 1520, a 30 second wait is applied. Control then passes to step 1508 where the process for selecting a new event/rumor from the same news tree is executed. Thus, every thirty seconds a news event/rumor is generated that affects the price of one of the stocks. The present invention is not limited to thirty second waits between news events. One skilled in the relevant art(s) would know that more or less time between news events could be applied without departing from the scope of the present invention.

Figure 16:
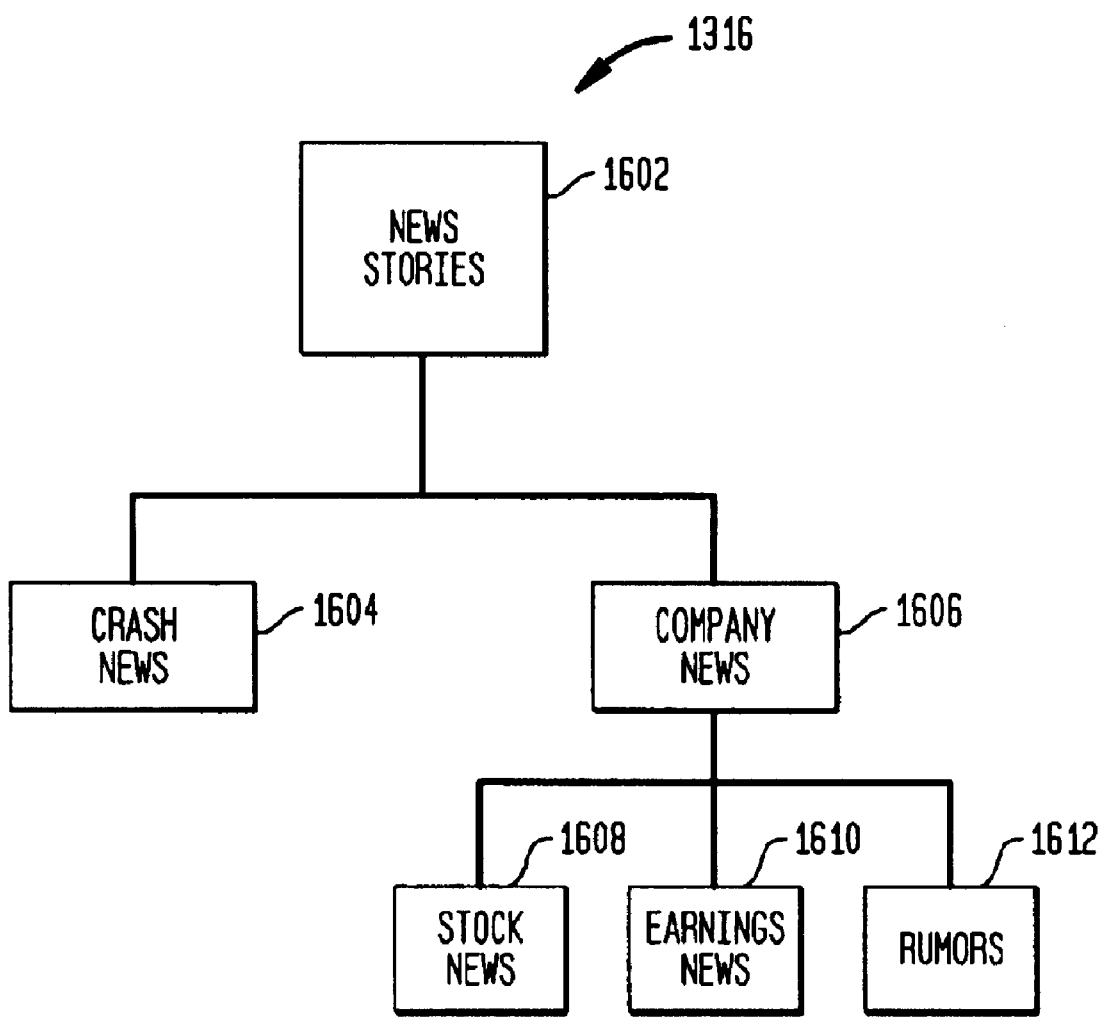
FIG. 16 illustrates the types of news stories generated by a news/rumor generator according to an embodiment of the present invention.

FIG. 16 illustrates the types of news stories generated by news/rumor generator 1316. News stories 1602 are divided into the following categories: crash news 1604 and company news 1606.

At the beginning of each game, news/rumor generator 1316 tests to see if it should generate a crash scenario. The probability of generating a crash scenario for the present options game is a one in ten chance every time the game is played. Crash news 1604 results in an economic crash that causes all stocks to move downward in price.

If a crash scenario is to be generated with the present options game, the crash scenario will begin after the first half of the game has been played. News/rumor generator 1316 will select a crash scenario at random. The crash scenario will move the market down approximately twenty percent over a series of trades. A method for using a set of trades to move a stock price up or down will be described below with reference to FIG. 17.

Company news 1606 comprises news stories specific to a company, such as earnings, take overs, etc. Each news story has a value from −5 to +5 attached to it that drives (a) the price of the stock for the company, and (b) the bias for the earnings of the company. Although the present invention attaches a −5 to +5 value to a news story, the present invention is not limited to a −5 to +5 range. One skilled in the relevant art(s) would know that other ranges could be used without departing from the scope of the invention. The following table shows how the value of a news story causes a percentage change in the stock price.

TABLE 1

| Value | Stock Change Range |
|---|---|
| −5 | −10% to −8% |
| −4 | −7.9% to −5% |
| −3 | −4% to −3% |
| −2 | −2.9% to −1.5% |
| −1 | −1.4% to 0% |
| 0 | |
| 1 | 0% to 1.4% |
| 2 | 1.5% to 1.9% |
| 3 | 3% to 4.9% |
| 4 | 5% to 5.9% |
| 5 | 8% to 10% |

The stock change range is chosen randomly. For example, if the value of the news is −5 the stock change range is −10 to −8%. Values of −10 to −8% in quarterly increments are entered into a hat and one percentage range is randomly chosen. The simulation then generates a random series of 5 to 7 trades that result in the randomly chosen percentage change in the price of the stock. Again, the hat method is used to determine the number of trades (i.e., 5, 6, or 7). The present invention is not limited to 5 to 7 trades. A person skilled in the relevant art(s) would know that other ranges of trades could be used without departing from the scope of the invention.

Company news is comprised of three types of news. The first type of news is stock news 1608. Stock news 1608 refers to news events about the company that affect the price of the stock. The second type of company news 1606 is earnings news 1610. Earnings news 1610 represents news events that announce earnings of the company.

At week 3 of the options game of the present invention, an earnings news story 1610 is generated for each company. At the start of week 3, currently running news stories for a specific company will be completed prior to playing the earnings news story 1610.

A running average of the affect values of the news events that have occurred within a particular game, for a company is kept by a news manager engine. The news earnings story is selected using that running average. The following table shows how a particular news earning story is selected using the running average.

TABLE 2

| Running Average | Earning Story |
| --- | --- |
| <−1.5 | first story (good) |
| −1.5 to +1.5 | second story (average) |
| >1.5 | third story (poor) |

Company news 1606 also includes rumor news 1612. Rumor news 1612 consists of a rumor or opinion that is announced by a virtual trader or animated character in the pit. These animated characters are Dino, Barbara, Synthia, Miles, Ben, and Larry. Note that the present invention is not limited to the animated characters listed above. One skilled in the relevant art(s) would know that other animated characters could be used without departing from the scope and spirit of the present invention. While playing the options game of the present invention, players will meet these animated characters. These animated characters spread rumors and opinions about the companies in a player's pit. It is up to the players to figure out whether these rumors are accurate or not. Regardless, the rumors can also move the stock price.

These rumors are presented to the players as pop-ups in Perrenial main pit screen 200. One of the traders or personalities will pop-up and deliver a rumor to the current player or players.

3.2.2.1 How New Affects Trades

Figure 17:
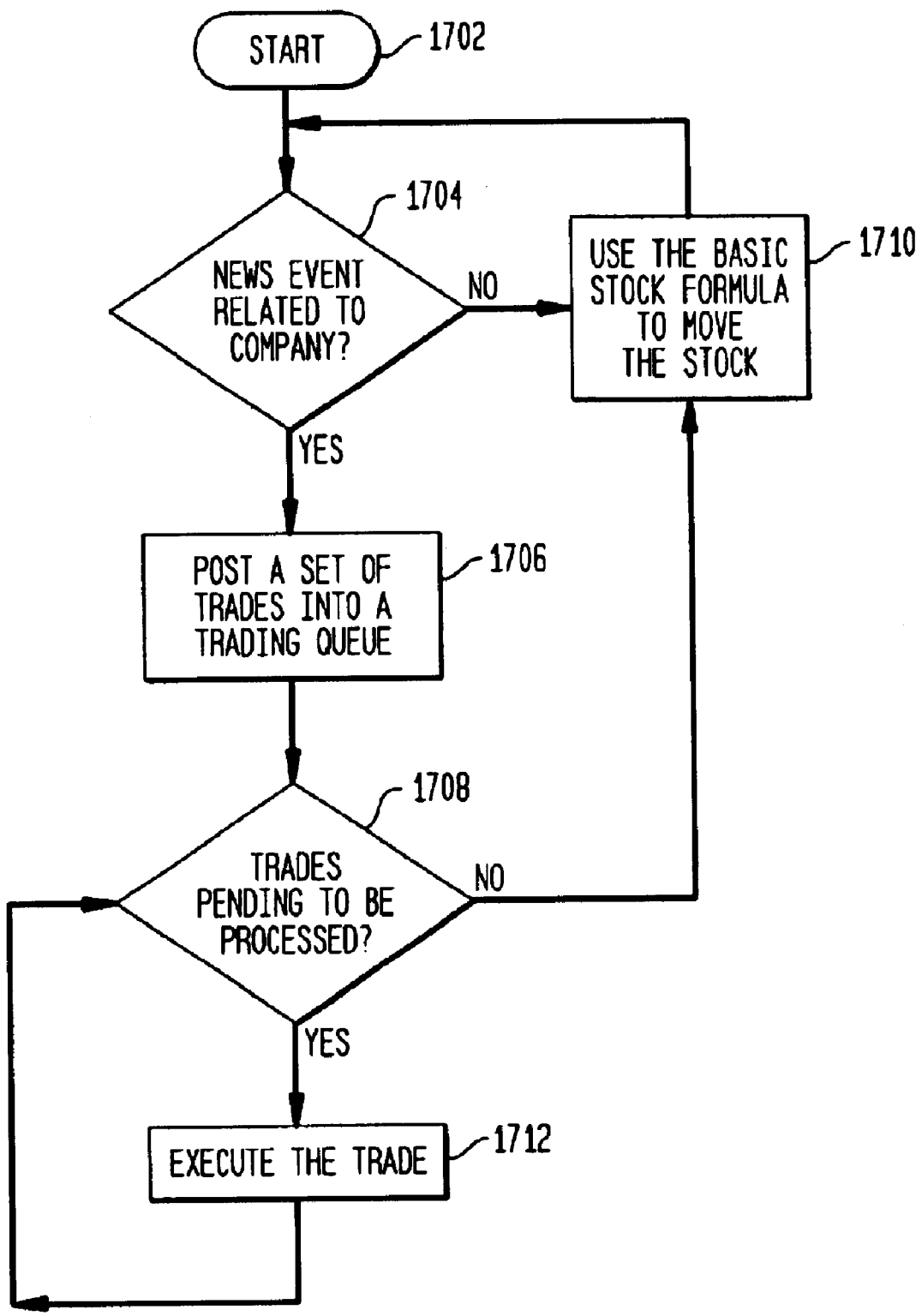
FIG. 17 is a flow diagram illustrating a method for using a set of trades to move a stock price up or down according to an embodiment of the present invention.

FIG. 17 is a flow diagram illustrating a method for using a set of trades to move a stock price up or down. The process begins in 1702 where control immediately passes to decision step 1704.

In decision step 1704 it is determined whether a news event related to a company has been generated. If a news event/rumor related to a company has been generated, control then passes to step 1706. In step 1706 a set of trades is posted into a trading queue. Control then passes to decision step 1708.

Returning to decision step 1704, if news events/rumors related to a company have not been generated, control then passes to step to 1710. In step 1710 the basic stock formula is used to move the stock.

In decision step 1708 it is determined whether trades are pending to be processed. If trades are pending to be processed, control then passes to step 1712.

Returning to decision step 1708, if there are no trades pending to be processed, control then passes to step 1710 where the basic stock formula is used to move the stock. Control then passes to step 1704 where the process begins again.

In step 1712 a trade is executed. Control is then passed back to decision step 1708 to determine whether additional trades are pending.

3.2.3 Floor Broker

Floor broker 1308 is an animated character named Peg. Peg will show up occasionally with an options deal at a price below the market. Players must decide whether Peg's advice is a good deal. Players must keep in mind that a cheap option may not always be the best deal.

Figure 19:
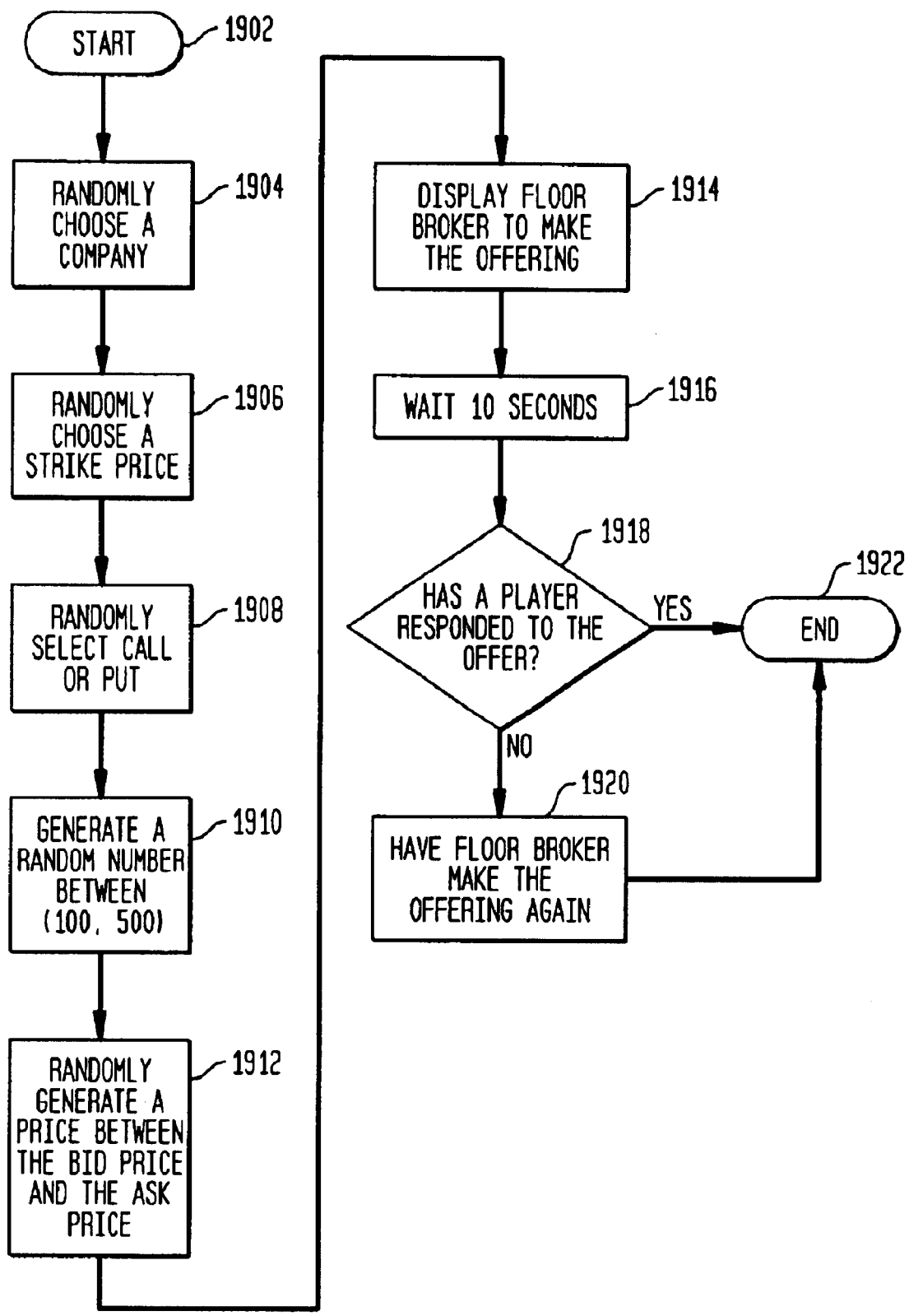
FIG. 19 represents a flow diagram illustrating a method used by a floor broker to generate an offer according to an embodiment of the present invention.

During the second and third week of the game, floor broker 1308 will generate an offer. FIG. 19 represents a flow diagram illustrating the method used by floor broker 1308 for generating an offer. The process begins with step 1902 where control is immediately passed to step 1904.

In step 1904, a company is chosen at random. The company chosen at random is one of the three companies in a player's pit of the present options game. Control then passes step 1906.

In step 1906, a strike price is randomly chosen from an available pool of strike prices. Control then passes to step 1908.

In step 1908, a call or a put is randomly chosen. Control then passes to step 1910.

In step 1910, a random number between 100 and 500 is generated. Control then passes to step 1912.

In step 1912, a price is randomly generated that lies between the bid price and the ask price of the option. Control then passes to step 1914.

In step 1914, floor broker 1308 is displayed in a pop-up. During this time, floor broker 1308 makes the offer to the player(s). Control then passes to step 1916.

In step 1916, floor broker 1308 waits ten seconds for a response from one or more players. Control then passes to decision step 1918.

In decision step 1918, it is determined whether a player has responded to the offer made by floor broker 1308. If a player has responded to the offer, control then passes to step 1922. If a player has not responded to the offer from floor broker 1308, control then passes to step 1920.

In step 1920, floor broker 1308 repeats the offering made earlier. After the floor broker repeats the offering, the dialog for the offering is dismissed. Control then passes to step 1922.

In step 1922, the process ends.

In a multi player game, floor broker 1308 is shown to all players. There is no co-relationship between the action of one player to the state of another player.

3.2.4 Options Pricing Generator

Returning to FIG. 13, options pricing generator 1320 is comprised of call price 1324, put price 1326, strike price generator 1329, bid-ask spread 1330, and infinite liquidity 1332. The price of options is computed using a theoretical value of an option. One such theoretical value is the Black-Scholes model. The Black-Scholes model considers the price of the stock, the option's strike price, the time remaining before expiration of the option, the volatility of the underlying stock, the stock's dividends, and the current interest rate. Although an option may trade for more or less than its theoretical value, the market views theoretical value as the objective standard of an option's value. The price of all options tend to migrate toward their theoretical value over time.

3.2.4.1 Call Price

The present invention uses the Black-Scholes formula for call price 1324 and put-call spread derivation for put price 1326.

The Black Scholes formula used to determine call price 1324 is shown in equation (3).

$$\text{Black Scholes} = p*N(d1) - s*e^{-rt}*N(d2); \quad (3)$$

$$\text{where: } d1 = (\ln(p/S) + r + (b^2/2)*t)/(b*\text{sqrt}(t)); \quad (4)$$

$$d2 = d1 - b*\text{sqrt}(t); \quad (5)$$

p=stock price;

s=strike price;

t=days remaining until expiration;

r=risk-free interest rate;

$$b = \text{annual volatility} + \text{random}(-5, +5) \quad (6)$$

ln=natural logarithm; and

N(x)=cumulative normal at x.

$$\text{Call price} = \text{Black Scholes Formula} \quad (7)$$

3.2.4.2 Put Price

Put price 1326 uses the call price and put-call parity to determine a put price. Put price is shown in equation (8).

$$\text{Put price} = \text{stock price} - \text{call price} + (\text{strike price} * e^{-rt}) \quad (8)$$

Note that no dividends are employed in the option game of the present invention. The risk-free interest rate (r) employed in the options game of the present invention is shown in equation (9).

$$r = 4.2\% + \text{random}(-0.05, +0.05). \quad (9)$$

3.2.4.3 Delta

Delta 1328 is the rate of change of price of the option for a change of the stock price. That is, how much the price of the option changes when the stock price changes. For a call, delta 1328 is obtained from the Black Scholes model.

$$\text{Call\_Delta} = N(d1) \quad (10)$$

where: $N(d1)$ is equal to the cumulative normal at $d1$.

$$\text{Put\_Delta} = 100 - \text{Call\_Delta}. \quad (11)$$

3.2.4.4 Bid-Ask Spread

Bid-ask spread is the spread between the bid and ask price. Bid-ask spread 1330 is determined using the following table:

TABLE 3

| Option Price | Spread |
|---|---|
| <3 | 1/16 |
| 3 to 6 | 1/8 |
| 6 to 9 | 1/4 |
| 9 to 20 | 1/2 |
| >20 | 3/4 |

3.2.4.4.1 Bid-Ask Randomizer

Bid-ask spread 1330 also includes a bid-ask randomizer 1318. To better reflect the inefficiencies of the real market, bid-ask randomizer 1318 slightly varies the option price. Bid-ask randomizer 1318 randomly selects a number from $-\frac{1}{4}$ to $+\frac{1}{4}$ in $\frac{1}{16}$ increments from a hat, with 60% of the numbers in the hat being 0. The value pulled from bid-ask randomizer 1318 will therefore have a higher probability of being 0. The bid-ask spread value remains the same, but periodically and randomly, bid-ask randomizer 1318 assigns an additional value to the theoretical options price to force the theoretical options price to vary slightly from the Black-Scholes price. The ask price for a call option is:

$$\text{Ask} = \text{Black-Scholes} + \text{randomizer value} + \text{Bid-Ask Spread}/2 \quad (12)$$

The bid price for a call option is:

$$\text{Bid} = \text{Black-Scholes} + \text{randomizer value} - \text{Bid-Ask Spread} \quad (13)$$

Ask and Bid are rounded to the nearest $\frac{1}{8}$ if the price is >=$3.00, and rounded to the nearest $\frac{1}{16}$ if the price is <$3.00.

3.2.4.5 Strike Price Generator

Additional option series are created in the options game of the present invention using a strike price generator 1329. New options series are created so that there is always an option series available at an attractive price for potential investors. For stocks priced at $25 or above, strike prices are generated in $5 increments. For stocks priced below $25, strike prices are generated in $2.50 increments. As the stock price increases, strike price generator 1329 creates a new option series in which the highest strike price is either $2.50 or $5 above the previous maximum strike price. As the stock price decreases, strike price generator 1329 creates a new option series in which the lowest strike price is $2.50 or $5 below the previous minimum strike price. The new option series is created when an option is priced half way between the highest and the second highest strike price. For example, the highest available strike price for a stock is $60. The next highest strike price is $55. When the stock price reaches 57 ½, a new options series will be created in which the highest strike price will be $65.

3.2.4.6 Infinite Liquidity

The present invention uses infinite liquidity 1332. Infinite liquidity 1332 implies that there is an infinite market. When a user places a trade, the number of contracts in the trade never exceeds the market. The trade is therefore placed at the present option or stock price.

3.2.5 Simulation Objects

Simulation objects 1322 are comprised of a company object 1334 and an internal financial calculator object 1336.

3.2.5.1 Company Object

Company object 1334 is responsible for keeping all of the information about each company in the options game of the present invention. Company object 1334 contains historical volatilities, 60 day prior information, starting price, etc.

3.2.5.1.1 Volatility

Volatility is a measurement of the amount of expected fluctuation in the stock price in a given time period. It is measured mathematically by the annual standard deviation of daily stock price changes. Each company will start with a specific historical volatility for the past 30 days. Volatility 1338 will change at the end of each week with the movement of the stock. At the end of each week, each company will re-compute their volatility based on the following formula:

$$\text{volatility} = (\text{volatility} + \text{sqrt}(\text{last} - \text{average})^2) \quad (14)$$

where: last=last price; and $$\text{average} = (\text{average} + \text{last})/2 \quad (15)$$

3.2.5.2 Internal Financial Calculator Object

Internal financial calculator object 1336 provides functionality for computing different financial data, such as the Black-Scholes options pricing model for call price 1324, put-call spread derivation for put price 1326, and call_delta and put_delta for delta 1328.

3.3 Portfolio Manager Engine

Portfolio Manager Engine 1306 is responsible for keeping track of a player's portfolio. Portfolio Manager Engine 1306 holds all the information on all the transactions made by the player. Portfolio Manager Engine comprises available cash/minimum balance mechanism 1340, risk analysis 1342, margin requirements 1344, profit and loss mechanism 1346, and trading rules/limitations 1348.

3.3.1 Available Cash/Minimum Balance Mechanism

Available cash/minimum balance mechanism 1340 determines how much a player is charged for buying or selling options or stock and for maintaining these positions. When a player starts the game, the player is given a $500,000 account. If a player then buys or sells stock or options, the player must be charged an appropriate amount of money for the transaction. Once these transactions are made and the player is carrying a position, the amount of money charged to maintain the player's portfolio (also referred to as carrying a position) also must be calculated as the price of the underlying stocks and options change. This is done with every stock trade and is carried out using available/minimum balance mechanism 1340, risk analysis 1342, margin requirements 1344, and profit and loss mechanism 1346. At any given time within the game, a player's total portfolio value is equivalent to the starting amount of money plus or minus the profit loss in the game to that instant.

Maximum risk 1342 is the amount of money a player can lose for any given stock or option. Cash usage is the amount of money being used to maintain a portfolio as a whole, including options and stocks. When a player either buys or sells stock his cash usage changes. For all equity positions of a player, the cash taken out of the account is 50% of the current value of the stock the player owns. For example, if a player owns 100 shares of FAT and currently FAT is trading at 80 (last price), the cash taken out of the player's account if $4,000. Cash usage for an equity position or stock is shown in equation (16).

$$\text{cash usage} = 0.5 * (\text{stock quantity} * \text{last price}) \quad (16)$$

where: stock quantity=number of shares; and
last price=last price at which the stock was trading.

For all options positions of the player, the cash taken out of the player's account is 50% of the maximum amount of money that the player would lose if the stock moved up or down two strike prices at the expiration day. In other words, it is the maximum risk. All option positions are charged on a risk based measurement system. This risk based measurement system is performed by risk analysis 1342. Risk analysis 1342 measures the risk, i.e., the amount of money a player can lose in his positions from the specific moment until the first expiration. If the stock has not changed then the last stock price is used.

3.3.2 Risk Analysis

To determine the risk, risk analysis 1342 uses the bid price, the price at which the player can currently sell his position. Thus, the cash usage by options is shown in equation (17).

$$\text{cash usage} = 0.5 * (\text{maximum risk}) \quad (17)$$

The total available cash formula is shown in equation (18).

$$\text{total\_avail\_cash} = \text{total portfolio value} - \text{cash used by stock} - \text{cash usage by options} \quad (18)$$

$$\text{where: total portfolio value} = \text{starting cash} + \text{profit/loss} \quad (19)$$

3.3.3 Margin Requirements

The present options game requires a player to maintain in available cash at least 20% of its original cash. The present options game checks this requirement in two places: (1) when a trade is being executed; and (2) whenever the stock moves.

Margin requirements 1344 keeps track of the minimum equity required in a player's account to support the player's total investment position. To buy on margin is to borrow part of the security's price from a brokerage firm.

Figure 18A:
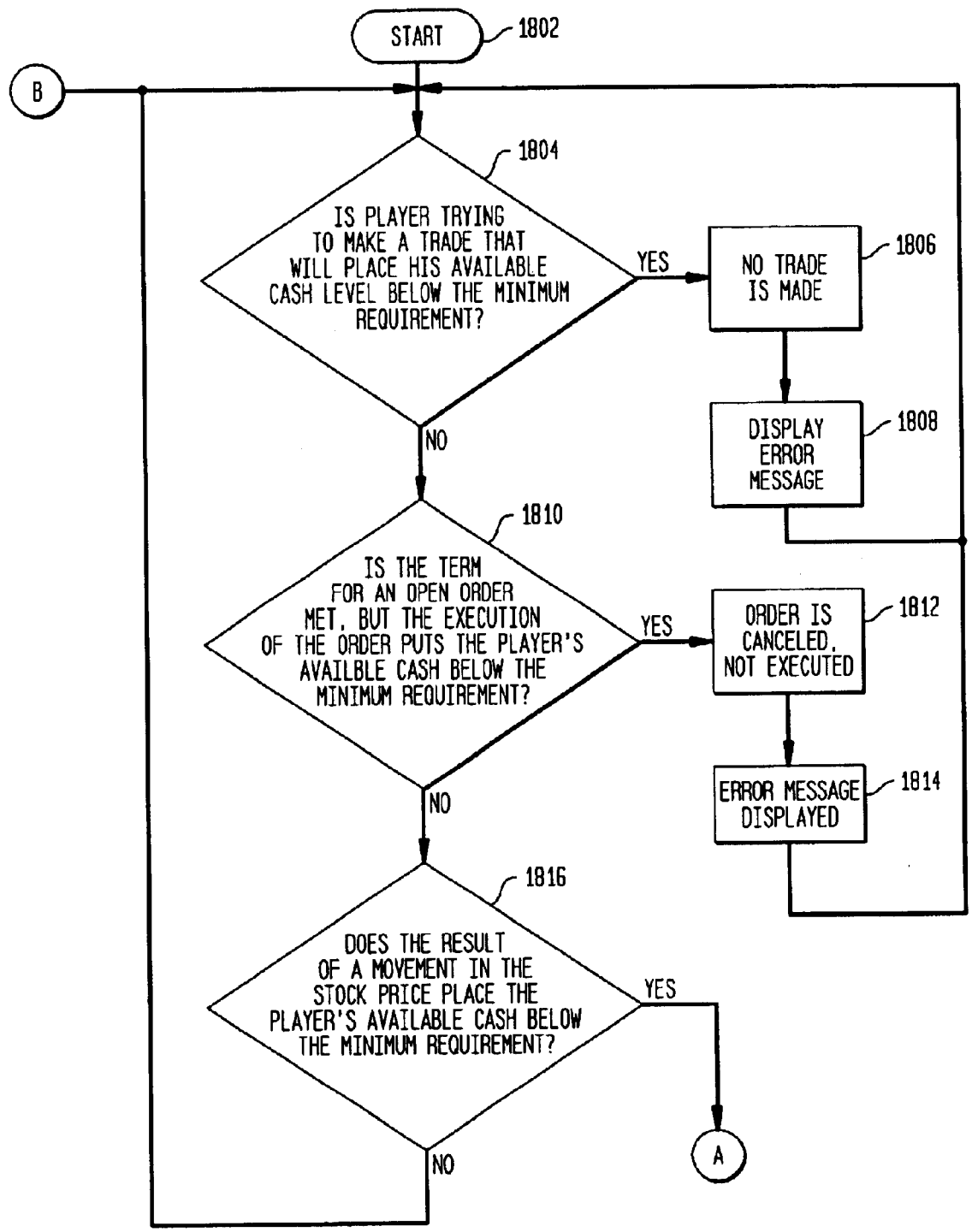
FIGS. 18A and 18B illustrate how margin requirements are handled when a player is trying to place a trade that does not maintain an available 20 percent cash level according to an embodiment of the present invention.
Figure 18B:
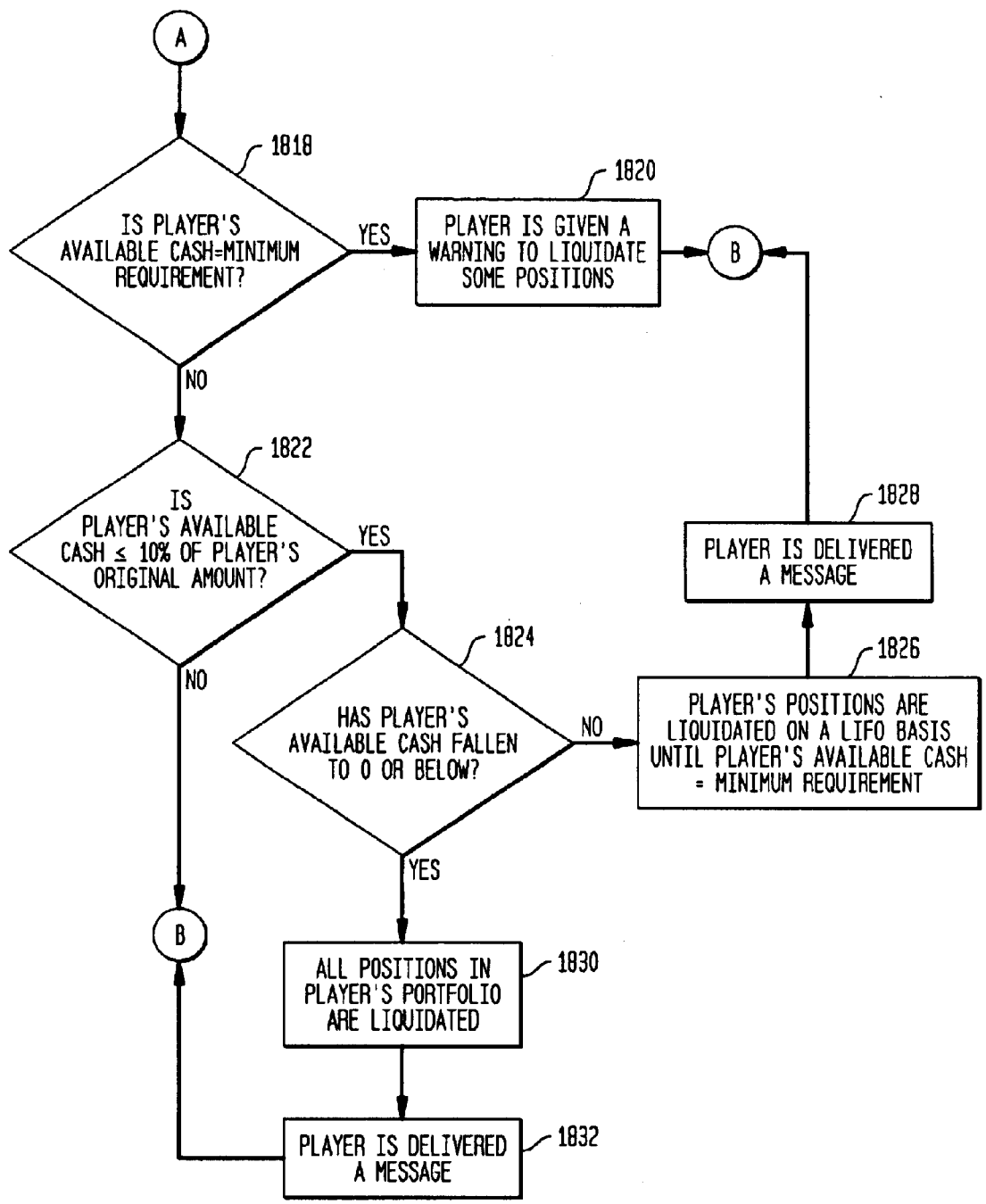

FIGS. 18A and 18B illustrate how margin requirements are handled when a player is trying to place a trade that does not maintain the required available 20 percent cash level. In FIG. 18A, the process begins with step 1802 where control is immediately passed to decision step 1804.

In decision step 1804, it is determined whether a player is trying to make a trade that will place his available cash level below the minimum requirement. If the player is not trying to make a trade that will place his available cash level below the minimum requirement, control is then passed to step 1810.

In step 1804, if it is determined that the player is trying to make a trade that will place his available cash level below the minimum requirement, control is passed to 1806. In step 1806, the trade is not allowed. Control then passes to step 1808.

In step 1808, an error message is displayed to the player that indicates that the player's order could not be executed due to insufficient funds. Control then passes back to step 1804.

In decision step 1810, it is determined whether the term for an open order is met, but the execution of the order puts the player's available cash below the minimum requirement. If the term for an open order is not met or the term for an open order is met but the execution of the order does not jeopardize the player's available cash below the minimum requirement, control then passes to step 1816. If in the alternative, the term for an open order is met and the execution of the order puts the player's available cash below the minimum requirement, control then passes to step 1812. In step 1812, the order is canceled. Control then passes to step 1814.

In step 1814, an error message is displayed to the player stating that the following open order could not be executed due to insufficient funds. Control then passes back to step 1804.

In decision step 1816 it is determined whether the result of a movement in the stock price places the player's available cash below the minimum requirement. If the result of a movement in the stock price does not place the player's available cash level below the minimum requirement, control passes back to step 1804. If a movement in the stock price does place the player's available cash below the minimum requirement, control then passes to decision step 1818 in FIG. 18B.

In decision step 1818, it is determined whether the player's available cash is equal to the minimum requirement. If the player's available cash is equal to the minimum requirement, control then passes to step 1820.

In step 1820, the player is given a margin call. The player is given a warning indicating that the player may need to liquidate some positions to bring the player's available cash above the minimum requirement. Control then passes back to step 1804 in FIG. 18A.

Returning to decision step 1818 in FIG. 18B, if the player's available cash is not equal to the minimum requirement, control passes to decision step 1822.

In decision step 1822, it is determined whether the player's available cash is less than or equal to 10% of the original amount. If the player's available cash is less than or equal to 10% of the original amount, control passes to step decision step 1824.

In decision step 1824, it is determined whether the player's available cash is 0 or below. If the player's available cash is not 0 or below, control passes to step 1826.

In step 1826, the player's positions are liquidated on a Last-In-First-Out (LIFO) basis until the player's available cash is equal to the minimum requirement. Control then passes to step 1828.

Returning to decision step 1824, if the player's available cash is 0 or below, control then passes to step 1830.

In step 1830, all positions in the player's portfolio are liquidated. The cash amount goes into the player's account for continuing play of the game. Control then passes to step 1832.

In step 1832, a message is delivered to the player indicating that due to insufficient cash to cover the player's margin requirements, all positions of the player have been liquidated. Control then passes back to step 1804 in FIG. 18A.

Returning to FIG. 18B, in step 1828, a message is delivered to the player indicating that due to insufficient cash to cover the player's margin requirement, some of the player's positions had to be liquidated. Control then passes back to step 1804 in FIG. 18A.

Returning to decision step 1822 in FIG. 18B, if the player's available cash is not less than or equal to 10% of the original amount, control then passes back to step 1804 in FIG. 18A.

3.3.4 Profit and Loss Mechanism

Profit and loss mechanism 1346 determines the profit and loss for equity positions, option positions, long positions, and short positions. The profit and loss for an equity position is equal to:

$$P/L = (\text{quantity} * \text{last price}) - \text{money spent} + \text{money received} \quad (20)$$

The profit and loss for the options position is determined for a long position and a short position. If the quantity owned is greater than zero, which is a long position, profit and loss is equal to:

$$P/L = (\text{quantity} * \text{option bid price}) - \text{money spent} + \text{money received} \quad (21)$$

If the quantity owned is less than zero, indicating a short position, profit and loss is equal to:

$$P/L = (\text{quantity} * \text{option ask price}) - \text{money spent} + \text{money received} \quad (22)$$

The net gain and loss is the addition of all the profit and losses for all stocks plus the profit and losses for all options.

3.3.5 Trading Rules/Limitations

The options game of the present invention requires that certain trading rules and trading limitations be followed. Trading rules/limitations 1348 keeps track of the stock and option orders that are executed in order to maintain trading rules and trading limitations.

Stock and option orders are executed using the following rules:

1. Players can only execute short sell orders on a zero or uptick of the stock. That is, the last trade must be on an uptick.
2. Orders placed on the weekends (including the weekend before the game starts) are executed on the following Monday.
3. Order placed with "Term" being "Market" are executed the moment they are placed (except on the weekends).
4. Orders placed with "Term" being "Limit" are executed according to the rules listed in Table 4.
5. Orders placed with "Term" being "Stop" are executed according to the rules listed in Table 5.

TABLE 4

|  | Price < Market | Price > Market |
| --- | --- | --- |
| Buy | Executed when ask <= limit price | Not allowed |
| Sell | Not Allowed | Executed when bid >= limit price |

TABLE 5

|  | Price < Market | Price > Market |
| --- | --- | --- |
| Buy | Not allowed | Executed when ask >= stop price |
| Sell | Executed when bid <= stop price | Not allowed |

Trading limitations include the up tick rule. The uptick rules states that a player cannot sell short on a downtick or a zero downtick. Other restrictions that apply to the game are:

(1) Good Till Canceled (GTC): Trades placed with this term will be active as open until they are filled or explicitly canceled by the user.

(2) Good for One Week (GOW): Trades placed with this term will be active until they are filled or the week that the trades where placed ends.

When open orders are filled, the player receives a message stating that the order has been filled. Example messages are as follows. For equity orders, an exemplary message may read:

The following order has been filled:
   By 100 FAT @ 75½.

For option orders, an exemplary message may read:
   The following order has been filled:
      Sell 100 FAT Jul 70 CALL @ 3¼.

For double options, an exemplary message may read:
   The following order has been filled:
      Sell 100 FAT Jul 70 CALL @ 3¼
      Buy 100 FAT Jul 75 CALL @ 3¼.

For options and equity, an exemplary message may read:
   The following order has been filled:
      Buy 100 FAT @ 75½
      Sell 1 FAT Jul 70 CALL @ 3¼.

4.0 Environment

The present invention (i.e., the options simulation game, the options simulation engine, or any part thereof) may be implemented using hardware, software, or a combination thereof, and may be implemented in one or more computer systems or other processing systems. In fact, in one embodiment, the invention is directed toward one or more computer systems capable of carrying out the functionality described herein.

Figure 20:
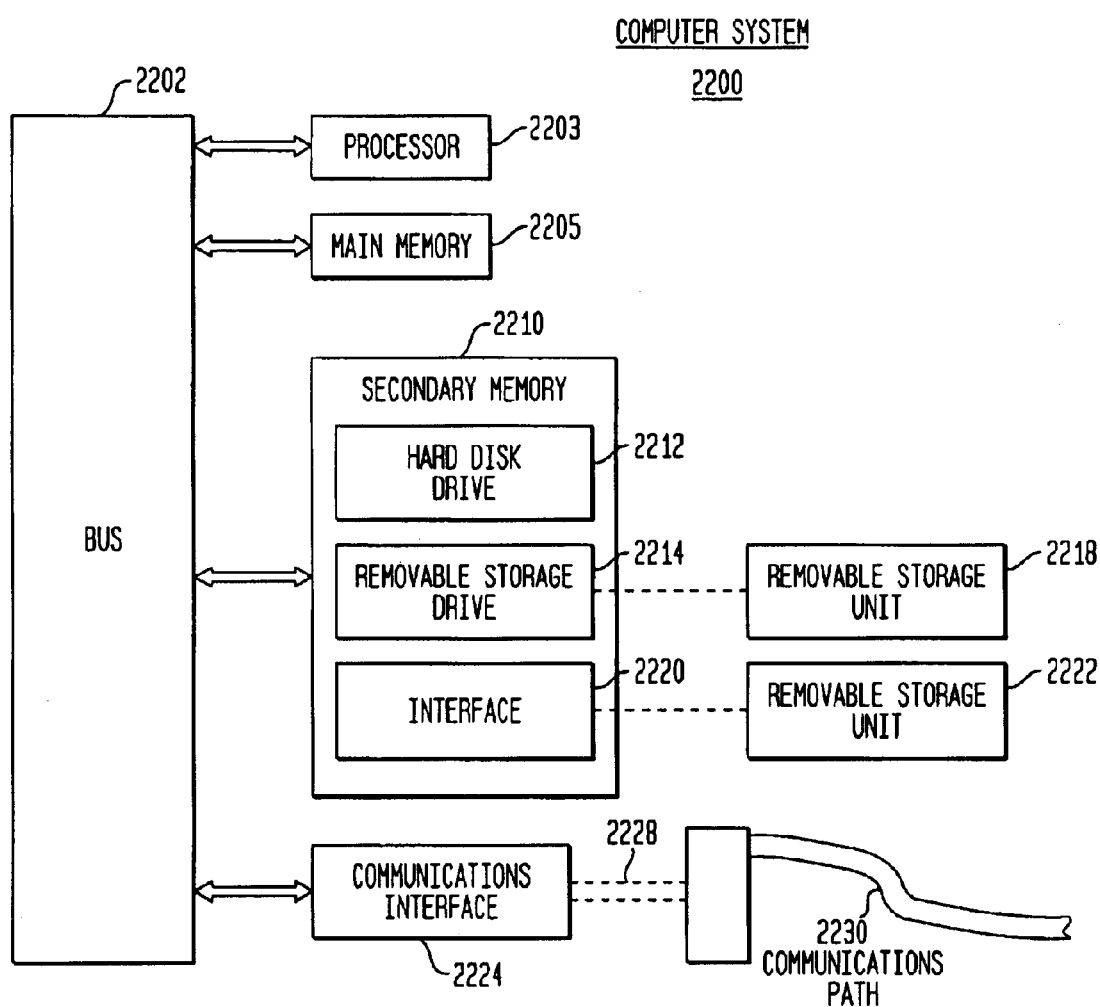
FIG. 20 is a diagram illustrating an exemplary computer system.

An example of a computer system 2000 is shown in FIG. 20. The computer system 2000 includes one or more processors, such as processor 2003. Processor 2003 is connected to a communication bus 2002. Various software embodiments are described in terms of this exemplary computer system. After reading this description, it will be apparent to a person skilled in the relevant art(s) how to implement the invention using other computer systems and/or computer architectures.

Computer system 2000 also includes a main memory 2005, preferably random access memory (RAM), and may also include a secondary memory 2010. The secondary memory 2010 may include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well known manner. Removable storage unit 2018, represents a floppy disk, magnetic tape, optical disk, etc. which is read by and written to by removable storage drive 2014. As will be appreciated, the removable storage unit 2018 includes a computer usable storage medium having stored therein computer software and/or data.

In alternative embodiments, secondary memory 2010 may include other similar means for allowing computer programs or other instructions to be loaded into computer system 2000. Such means may include, for example, a removable storage unit 2022 and an interface 2020. Examples of such may include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a PCMCIA slot and card, etc. Software and data transferred via communications interface 2024 are in the form of signals 2028 which may be electronic, electromagnetic, optical or other signals capable of being received by communications interface 2024. These signals 2028 are provided to communications interface 2024 via a communications path (i.e., channel) 2026. This channel 2026 carries signals 2028 and may be implemented using wire or cable, fiber optics, a phone line, a cellular phone link, an RF link and other communications channels.

In this document, the term "computer program product" refers to removable storage units 2018, 2022, and signals 2028. These computer program products are means for providing software to computer system 2000. The invention is directed to such computer program products.

Computer programs (also called computer control logic) are stored in main memory 2005, and/or secondary memory 2010, and/or in computer program products. Computer programs may also be received via communications interface 2024. Such computer programs, when executed, enable computer system 2000 to perform the features of the present invention as discussed herein. In particular, the computer programs, when executed, enable the processor 2003 to perform the features of the present invention. Accordingly, such computer programs represent controllers of the computer system 2000.

In an embodiment where the invention is implemented using software, the software may be stored in a computer program product and loaded into computer system 2000 using removable storage drive 2014, hard drive 2012 or communications interface 2024. The control logic (software), when executed by the processor 2003, causes the processor 2003 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

5.0 Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. An options simulation engine for an options trading game, comprising:
   an options market simulator for providing a real-world options trading environment, said options market simulator comprising
   a basic stock price generator for moving stock prices;
   a news/rumor generator for moving stock prices; and
   an options pricing generator for pricing options; and
   a portfolio manager engine for keeping track of a player's portfolio.

2. The options simulation engine of claim 1, further comprising:
   a game engine for keeping track of game time and game settings.

3. The options simulation engine of claim 1, wherein said portfolio manager engine comprises:
   an available cash/minimum balance mechanism for determining how much a player is charged for buying and/or selling options and stocks.

4. The options simulation engine of claim 1, wherein said portfolio manager engine comprises:
   a risk analysis mechanism for determining the amount of money a player can lose on any given stock or option.

5. The options simulation engine of claim 1, wherein said portfolio manager engine comprises:
   a margin requirements mechanism for keeping track of the minimum equity required in a player's account to support a player's total investment position.

6. The options simulation engine of claim 1, wherein said portfolio manager engine comprises:
   a profit and loss mechanism for determining a player's profit and loss throughout the options trading game and on a weekly basis.

7. The options simulation engine of claim 1, wherein said portfolio manager engine comprises:
   a trading rules/limitations mechanism for preventing a player from breaking a trading rule and exceeding a limitation during game play.

8. The options simulation engine of claim 1, wherein said news/rumor generator generates news stories and rumors about one or more companies in a player's portfolio to affect the stock price of said one or more companies.

9. The options simulation engine of claim 1, wherein said basic stock price generator generates semi-random movements of the price of each stock.

10. The options simulation engine of claim 1, wherein said options trading game is divided into four trading weeks separated by weekends to simulate a time-condensed version of a 30-day options cycle.

11. The options simulation engine of claim 10, wherein weekends provide a player the opportunity to relax and review a previous week's activities, such as the news, stock quotes, and rumors, before resuming play of the trading options game.

12. The options simulation engine of claim 1, wherein news is displayed over a news ticker and a plurality of virtual traders interact with a player to provide rumors related to companies in a player's pit.

13. The options simulation engine of claim 1, wherein one or more players trade in and out of options and equity positions as they see fit by analyzing news, rumors, and information about one or more companies until the trading options game ends.

14. The options simulation engine of claim 1, wherein the trading options game comprises:
- a trading pit where all of the action takes place;
- a data source of available options on companies in a player's pit, wherein said data source provides quotes on options and equity prices;
- a company information screen where a player can learn background and historical information about the companies in the player's pit;
- a stock graph for tracking prices of stocks in the player's pit;
- a news archive screen for enabling the player to view relevant news on companies in the player's pit;
- a portfolio screen for enabling the player to review the status of the player's portfolio; and
- a help/glossary screen for enabling the player to retrieve answers to game questions and review a glossary of options terms.

15. The options simulation engine of claim 1, wherein said options market simulator further comprises a floor broker, wherein said floor broker shows up occasionally with an options deal at a price below market value, wherein a player must determine whether the options deal is a good deal or a bad deal.

16. The options simulation engine of claim 1, wherein said options pricing generator comprises:
- a call price;
- a put price;
- a delta, wherein said delta is a rate of change of price of an option for a change in stock price;
- a bid-ask price, wherein said bid-ask price is the spread between a bid price and an ask price; and
- infinite liquidity, wherein said infinite liquidity implies that there is an infinite market, whereby the number of contracts in a trade never exceeds the market by placing the trade at a present option price or a stock price,
- wherein said options pricing generator computes the price of options using a Black-Scholes formula.

17. The options simulation engine of claim 1, further comprising a strike price generator for creating option series to enable the availability of option series at attractive prices for potential investors.

18. A computer program product comprising a computer useable medium including control logic stored therein, said control logic enabling an options simulation engine for an options trading game, said control logic comprising:
- options market simulator means for enabling a processor to provide a real-world options trading environment, said options market simulator means comprising
  - basic stock price generating means for enabling a processor to move stock prices;
  - news/rumor generating means for enabling a processor to move stock prices; and
  - options pricing generating means for enabling a processor to price options; and
- portfolio manager engine means for enabling a processor to keep track of a player's portfolio.

19. The computer program product of claim 18, said control logic further comprising:
- game engine means for enabling a processor to keep track of game time and game settings.

20. The computer program product of claim 18, wherein said portfolio manager engine means comprises:
- available cash/minimum balance means for enabling a processor to determine how much a player is charged for buying and/or selling options and stocks.

21. The computer program product of claim 18, wherein said portfolio manager engine means comprises:
- risk analysis means for enabling a processor to determine the amount of money a player can lose on any given stock or option.

22. The computer program product of claim 18, wherein said portfolio manager engine means comprises:
- margin requirements means for enabling a processor to keep track of the minimum equity required in a player's account to support a player's total investment position.

23. The computer program product of claim 18, wherein said portfolio manager engine means comprises:
- profit and loss means for enabling a processor to determine a player's profit and loss throughout the options trading game and on a weekly basis.

24. The computer program product of claim 18, wherein said portfolio manager engine means comprises:
- trading rules/limitations means for enabling a processor to prevent a player from breaking a trading rule and exceeding a limitation during game play.

25. The computer program product of claim 18, wherein said news/rumor generating means enables a processor to generate news stories and rumors about one or more companies in a player's portfolio to affect the stock price of said one or more companies.

26. The computer program product of claim 18, wherein said basic stock price generating means enables a processor to generate semi-random movements of the price of each stock.

27. The computer program product of claim 18, wherein said options trading game is divided into four trading weeks separated by weekends to simulate a time-condensed version of a 30-day options cycle.

28. The computer program product of claim 27, wherein weekends provide a player the opportunity to relax and review a previous week's activities, such as the news, stock quotes, and rumors, before resuming play of the trading options game.

29. The computer program product of claim 18, wherein news is displayed over a news ticker and a plurality of virtual traders interact with a player to provide rumors related to companies in a player's pit.

30. The computer program product of claim 18, wherein one or more players trade in and out of options and equity positions as they see fit by analyzing news, rumors, and information about one or more companies until the trading options game ends.

31. The computer program product of claim 18, wherein the trading options game comprises:
- means for enabling a processor to provide a trading pit where all of the action takes place;
- means for enabling a processor to provide a data source of available options on companies in a player's pit, wherein said data source provides quotes on options and equity prices;
- means for enabling a processor to provide a company information screen, wherein said company information screen enables a player to learn background and historical information about the companies in the player's pit;
- means for enabling a processor to provide a stock graph for tracking prices of stocks in the player's pit;

means for enabling a processor to provide a news archive screen for enabling the player to view relevant news on companies in the player's pit;

means for enabling a processor to provide a portfolio screen for enabling the player to review the status of the player's portfolio; and means for enabling a processor to provide a help/glossary screen for enabling the player to retrieve answers to game questions and review a glossary of options terms.

32. The computer program product of claim 18, wherein said options market simulator means further comprises floor broker means for enabling a processor to provide a floor broker, wherein said floor broker shows up occasionally with an options deal at a price below market value, wherein a player must determine whether the options deal is a good deal or a bad deal.

33. The computer program product of claim 18, wherein said options pricing generating means comprises:

call price means for enabling a processor to generate a call price for an option;

put price means for enabling a processor to generate a put price for said option;

delta means for enabling a processor to generate a delta value for said option, wherein said delta value is a rate of change of price of an option for a change in stock price;

bid-ask price means for enabling a processor to generate a bid-ask price, wherein said bid-ask price is the spread between a bid price and an ask price; and infinite liquidity means for enabling a processor to prevent the number of contracts in a trade from exceeding the market by placing the trade at a present option price or a stock price, wherein infinite liquidity implies that there is an infinite market;

wherein said options pricing generating means enables a processor to compute the price of options using a Black-Scholes formula.

34. The computer program product of claim 18, further comprising strike price generating means for enabling a processor to create option series to enable the availability of option series at attractive prices for potential investors.

* * * * *